(12) United States Patent
Megyese et al.

(10) Patent No.: US 11,651,334 B1
(45) Date of Patent: May 16, 2023

(54) SYSTEMS AND METHODS FOR ENHANCING WASTE DISPOSAL AND ENERGY EFFICIENCY USING SENSOR AND ALTERNATIVE POWER TECHNOLOGIES

(71) Applicant: State Farm Mutual Automobile Insurance Company, Bloomington, IL (US)

(72) Inventors: Matthew Megyese, Phoenix, AZ (US); Sarah Ann Lockenvitz, Scottsdale, AZ (US); Paul Bates, Mesa, AZ (US); Nicholas Carmelo Marotta, Scottsdale, AZ (US); Cathy Jo Roth, Queen Creek, AZ (US); Austin Rowley, Mesa, AZ (US); Jared Wheet, Mesa, AZ (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 300 days.

(21) Appl. No.: 17/018,442

(22) Filed: Sep. 11, 2020

Related U.S. Application Data

(60) Provisional application No. 62/972,488, filed on Feb. 10, 2020, provisional application No. 62/949,776, (Continued)

(51) Int. Cl.
*G06Q 10/00* (2012.01)
*G06Q 30/02* (2012.01)
(Continued)

(52) U.S. Cl.
CPC ......... *G06Q 10/30* (2013.01); *G06Q 30/0208* (2013.01); *H04W 4/38* (2018.02)

(58) Field of Classification Search
None
See application file for complete search history.

(56) References Cited

U.S. PATENT DOCUMENTS

| | | | |
|---|---|---|---|
| 4,454,028 A | 6/1984 | Vetter et al. | |
| 5,447,017 A | 9/1995 | Becher et al. | |

(Continued)

FOREIGN PATENT DOCUMENTS

| | | | |
|---|---|---|---|
| CN | 204161900 U | 2/2015 | |
| IN | 201821035769 A | 10/2018 | |

(Continued)

*Primary Examiner* — Jan P Mincarelli
(74) *Attorney, Agent, or Firm* — Armstrong Teasdale LLP

(57) ABSTRACT

A computer system including sensor and alternative power technologies for enhancing waste disposal and energy efficiency using is provided. The computer system may be configured to receive waste data and recycling data from at least one sensor located proximate to a waste bin, and determine a level of waste in the waste bin based upon the received waste data, and a level of contamination of the waste bin based upon the received recycling data. The computer system may be also configured to determine whether collection of waste in the waste bin or decontamination of the waste bin is required. The computer system may be further configured to generate an alert including information corresponding collection or decontamination of the waste bin, and transmit the alert to one or more client devices associated with at least one user.

19 Claims, 8 Drawing Sheets

Related U.S. Application Data filed on Dec. 18, 2019, provisional application No. 62/939,903, filed on Nov. 25, 2019.

(51) Int. Cl.
  *H04W 4/38* (2018.01)
  *G06Q 10/30* (2023.01)
  *G06Q 30/0208* (2023.01)

(56) References Cited

U.S. PATENT DOCUMENTS

| | | |
|---|---|---|
| 5,590,791 A | 1/1997 | Gschweitl |
| 5,626,240 A | 5/1997 | Friedrichs et al. |
| 7,454,358 B2 | 11/2008 | Mallett et al. |
| 8,731,974 B2 | 5/2014 | Pandhi et al. |
| 9,067,245 B2 | 6/2015 | Hubbell et al. |
| 9,811,862 B1 | 11/2017 | Allen et al. |
| 2003/0141225 A1 | 7/2003 | Liddle et al. |
| 2016/0078414 A1* | 3/2016 | Rathore ............... G06K 9/6267 705/308 |
| 2018/0016096 A1 | 1/2018 | Krishnamurthy et al. |
| 2018/0075417 A1* | 3/2018 | Gordon ................. G06V 20/17 |
| 2019/0035028 A1 | 1/2019 | Jones et al. |
| 2019/0283963 A1 | 9/2019 | Al-Ateeq |
| 2019/0340693 A1 | 11/2019 | Nair et al. |
| 2020/0175883 A1 | 6/2020 | Stelmar et al. |
| 2021/0035146 A1* | 2/2021 | Odom ................... G06Q 10/30 |

FOREIGN PATENT DOCUMENTS

| | | |
|---|---|---|
| IN | 201841003701 A | 3/2019 |
| IN | 202011000793 A | 2/2020 |
| IN | 202011004634 A | 2/2020 |
| KR | 2015079697 A | 7/2015 |
| KR | 2066986 B1 | 3/2020 |
| TW | M450561 U | 4/2013 |

* cited by examiner

SYSTEMS AND METHODS FOR ENHANCING WASTE DISPOSAL AND ENERGY EFFICIENCY USING SENSOR AND ALTERNATIVE POWER TECHNOLOGIES

CROSS-REFERENCE TO RELATED APPLICATIONS

This application claims the benefit to U.S. Provisional Patent Application No. 62/939,903, filed Nov. 25, 2019, entitled "SYSTEMS AND METHODS FOR ENHANCING WASTE DISPOSAL AND ENERGY EFFICIENCY USING SENSOR AND ALTERNATIVE POWER TECHNOLOGIES," to U.S. Provisional Patent Application No. 62/949,776, filed Dec. 18, 2019, entitled "SYSTEMS AND METHODS FOR ENHANCING WASTE DISPOSAL AND ENERGY EFFICIENCY USING SENSOR AND ALTERNATIVE POWER TECHNOLOGIES," and to U.S. Provisional Application No. 62/972,488, filed Feb. 10, 2020, entitled "SYSTEMS AND METHODS FOR ENHANCING WASTE DISPOSAL AND ENERGY EFFICIENCY USING SENSOR AND ALTERNATIVE POWER TECHNOLOGIES," the entire contents of which are hereby incorporated by reference in their entirety.

FIELD OF THE INVENTION

The present disclosure relates to enhancing waste disposal and energy efficiency and, more particularly, to network-based systems and methods for enhancing waste disposal and energy efficiency using sensor and alternative power technologies.

BACKGROUND

Communities are becoming more concerned about environmental issues. In particular, communities are concerned about public health that may be affected by environmental issues, such as waste disposal, pollution, deforestation, overpopulation, water scarcity and water pollution, among other environmental issues that are detrimental to public health. In recent years, awareness of these environmental issues has increased among communities. However, known systems for mitigating and/or eliminating these environmental issues may not be intuitive, convenient, and/or easy to use, discouraging members of the communities to use them.

BRIEF SUMMARY

The present embodiments may relate to systems and methods for enhancing waste disposal and energy efficiency using sensor and alternative power technologies. The system may include one or more detection and alert (DA) computing devices, one or more insurance provider servers, one or more client devices, one or more sensors, and/or one or more databases.

In one aspect, a computer system including sensor and alternative power technologies for enhancing waste disposal and energy efficiency may be provided. The computer system may include at least one computing device including at least one processor and/or associated transceiver in communication with at least one memory device. The at least one processor and/or associated transceiver may be programmed to: (i) receive waste data and recycling data from at least one sensor, wherein the waste data and the recycling data are gathered by the at least one sensor located proximate to a waste bin, (ii) determine a level of waste in the waste bin based upon the received waste data, and a level of contamination of the waste bin based upon the received recycling data, (iii) determine, based upon the level of waste, whether collection of waste in the waste bin is required, (iv) determine, based upon the level of contamination, whether decontamination of the waste bin is required, (v) in response to determining that one of collection of waste in the waste bin is required and decontamination of the waste bin is required, generate an alert including information corresponding to the waste bin, and (vi) transmit the alert, via wireless communication or data transmission, to one or more client devices associated with at least one user to notify the at least one user that the collection of waste in the waste bin is required or the decontamination of the waste bin is required. The computer system may include additional, less, or alternate functionality, including that discussed elsewhere herein.

In another aspect, a computer-implemented method for enhancing waste disposal and energy efficiency using a computer system including sensor and alternative power technologies may be provided. The computer system may include at least one computing device including at least one processor and/or associated transceiver in communication with at least one memory device. The method may include, via the at least one processor and/or associated transceiver: (i) receiving waste data and recycling data from at least one sensor, wherein the waste data and the recycling data are gathered by the at least one sensor located proximate to a waste bin, (ii) determining a level of waste in the waste bin based upon the received waste data, and a level of contamination of the waste bin based upon the received recycling data, (iii) determining, based upon the level of waste, whether collection of waste in the waste bin is required, (iv) determining, based upon the level of contamination, whether decontamination of the waste bin is required, (v) in response to determining that one of collection of waste in the waste bin is required and decontamination of the waste bin is required, generating an alert including information corresponding to the waste bin, and (vi) transmitting the alert, via wireless communication or data transmission, to one or more client devices associated with at least one user to notify the at least one user that the collection of waste in the waste bin is required or the decontamination of the waste bin is required. The method may include additional, less, or alternate actions, including those discussed elsewhere herein.

In yet another aspect, at least one non-transitory computer-readable media having computer-executable instructions thereon may be provided. The computer-executable instructions when executed by at least one processor (and/or associated transceiver) of a computing device for enhancing waste disposal and energy efficiency causes the at least one processor (and/or associated transceiver) to: (i) receive waste data and recycling data from at least one sensor, wherein the waste data and the recycling data are gathered by the at least one sensor located proximate to a waste bin, (ii) determine a level of waste in the waste bin based upon the received waste data, and a level of contamination of the waste bin based upon the received recycling data, (iii) determine, based upon the level of waste, whether collection of waste in the waste bin is required, (iv) determine, based upon the level of contamination, whether decontamination of the waste bin is required, (v) in response to determining that one of collection of waste in the waste bin is required and decontamination of the waste bin is required, generate an alert including information corresponding to the waste bin, and (vi) transmit the alert, via wireless communication or data transmission, to one or more client devices associated with at least one user to notify the at least one user that the collection of waste in the waste bin is required or the decontamination of the waste bin is required. The instructions may direct additional, less, or alternate functionality, including that discussed elsewhere herein.

In one aspect, a computer system including sensor and alternative power technologies for enhancing energy efficiency, and alerting users in real-time of energy levels corresponding to one or more electric devices may be provided. The computer system may include at least one computing device including at least one processor and/or associated transceiver in communication with at least one memory device. The at least one processor and/or associated transceiver may be programmed to: (i) collect, via at least one sensor, energy data from the one or more electric devices associated with a user, (ii) build, using the collected energy data, a risk profile for the user, wherein the risk profile includes energy consumption patterns of the one or more electric devices, (iii) receive insurance data from one or more insurance servers, wherein the insurance data includes one or more insurance plans, (iv) compare the risk profile to the one or more insurance plans. (v) determine, based upon the comparison, an insurance plan of the one or more insurance plans, wherein the insurance plan includes information matching most of the energy consumption patterns in comparison to other insurance plans of the one or more insurance plans, and (iv) transmit the insurance plan to one or more client devices associated with the user. The computer system may include additional, less, or alternate functionality, including that discussed elsewhere herein.

In another aspect, a computer-implemented method for enhancing energy efficiency, and alerting users in real-time of energy levels corresponding to one or more electric devices may be provided. The computer system may include at least one computing device including at least one processor and/or associated transceiver in communication with at least one memory device. The method may include, via the at least one processor and/or associated transceiver: (i) collecting, via at least one sensor, energy data from the one or more electric devices associated with a user, (ii) building, using the collected energy data, a risk profile for the user, wherein the risk profile includes energy consumption patterns of the one or more electric devices, (iii) receiving insurance data from one or more insurance servers, wherein the insurance data includes one or more insurance plans, (iv) comparing the risk profile to the one or more insurance plans, (v) determining, based upon the comparison, an insurance plan of the one or more insurance plans, wherein the insurance plan includes information matching most of the energy consumption patterns in comparison to other insurance plans of the one or more insurance plans, and (vi) transmitting the insurance plan to one or more client devices associated with the user. The method may include additional, less, or alternate actions, including those discussed elsewhere herein.

In yet another aspect, at least one non-transitory computer-readable media having computer-executable instructions thereon may be provided. The computer-executable instructions when executed by at least one processor (and/or associated transceiver) of a computing device for enhancing energy efficiency causes the at least one processor (and/or associated transceiver) to: (i) collect, via at least one sensor, energy data from the one or more electric devices associated with a user, (ii) build, using the collected energy data, a risk profile for the user, wherein the risk profile includes energy consumption patterns of the one or more electric devices, (iii) receive insurance data from one or more insurance servers, wherein the insurance data includes one or more insurance plans, (iv) compare the risk profile to the one or more insurance plans, (v) determine, based upon the comparison, an insurance plan of the one or more insurance plans, wherein the insurance plan includes information matching most of the energy consumption patterns in comparison to other insurance plans of the one or more insurance plans, and (iv) transmit the insurance plan to one or more client devices associated with the user. The instructions may direct additional, less, or alternate functionality, including that discussed elsewhere herein.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements, which are presently discussed, it being understood, however, that the present embodiments are not limited to the precise arrangements and are instrumentalities shown, wherein.

Figure 1:
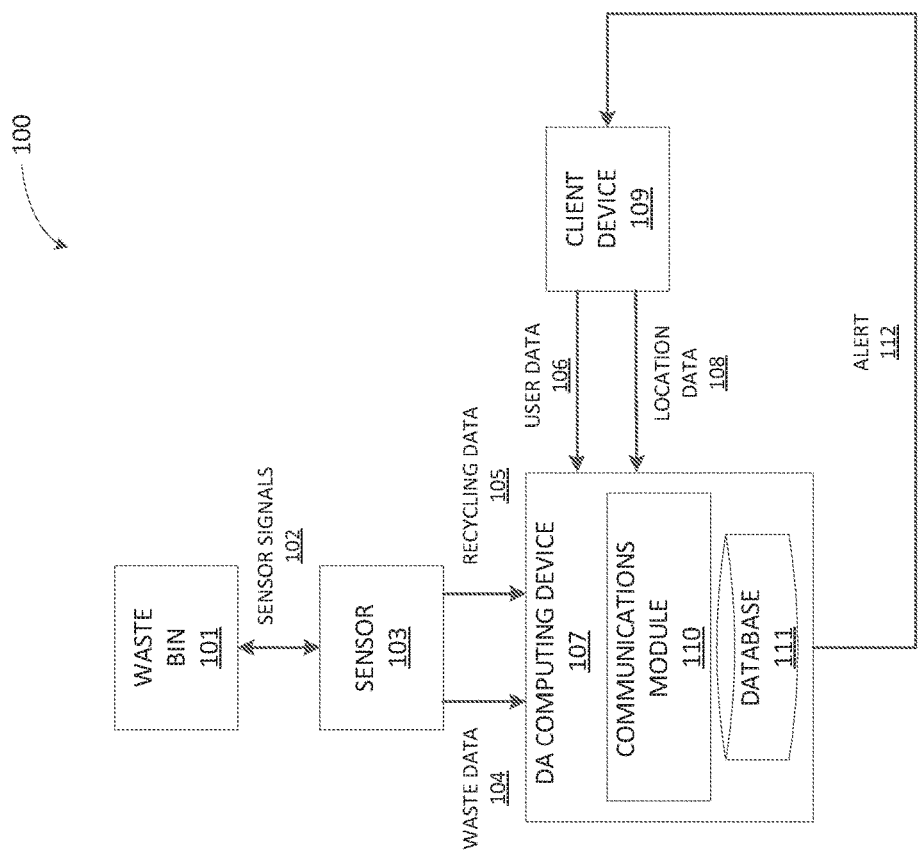
FIG. 1 illustrates a diagram of an exemplary computer system for waste disposal, and alerting users in real-time of waste levels and contamination in waste bins.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

The present embodiments may relate to, inter alia, systems and methods for enhancing waste disposal and energy efficiency using sensor and alternative power technologies. In particular, the systems and methods include a computer system configured to detect and alert, in real-time, waste (e.g., recyclable and/or non-recyclable waste) levels and contamination in bins (e.g., recycle and non-recycle or "trash" bins) and energy usage patterns of electric devices, such as electric charging stations, electric vehicles, and electric powered buildings. In at least one embodiment, the computer system may include a detection and alert (DA) computing device, at least one insurance provider server, at least one client device, one or more sensors, and a database. In other embodiments, the computer system may include a plurality of DA computing devices, insurance provider servers, client devices, sensors, and databases.

In the exemplary embodiment, the methods described herein may be performed by the DA computing device. The DA computing device may be in communication with the insurance provider server, the client device, the one or more sensors, and the database. The DA computing device may be configured to receive sensor data from the sensors. The sensors may include, but are not limited to, radar, LIDAR, Global Positioning System (GPS), video devices, imaging devices, cameras, audio recorders, computer vision, moisture sensors, chemical sensors, and power/energy trackers. The sensor data may include waste level data (also referred herein as to waste data), recycling data, and/or energy level data (also referred herein as to energy data). In some embodiments, the sensors are integral or coupled to bins, electric vehicle charging stations, or buildings. In other embodiments, the sensors are separate from bins, electric vehicle charging stations, or buildings, but may be placed in proximity thereto, or in any suitable location that enables the collection of sensor data as described herein. The DA computing device may be also configured to retrieve the waste data, the recycling data, and the energy data from the database, and/or store the waste data, the recycling data, and the energy data within the database.

In the exemplary embodiment, the DA computing device may be configured to analyze the waste data to determine a level of waste in each bin (e.g., whether waste is overflowing, full, about to be full, or at any other level in the bin), and generate an alert (e.g., a waste level alert) in real-time in response to determining that the level of waste in the bin is below, meets, or exceeds a predefined threshold. In one exemplary embodiment, the DA computing device may generate the waste level alert in response to determining that the level of waste exceeds a threshold indicating the associated bin is ready to be emptied. In addition to generating the alert, the DA computing device may flag the bin within a database as having an issued waste level alert, and transmit the alert in real-time to client devices associated with users of the bins. The DA computing device may identify the users of the bins and respective client devices using user data previously received from the client devices associated with the users.

In the exemplary embodiment, the DA computing device may receive the user data in response to a user registering within the computer system and/or opting in to receive alerts. The user data for each user may include information associated with the user and their associated client device. Such information may include a user identifier, a client device identifier, a home address, a business address, a phone number, name(s) of the user, and the like.

The DA computing device may identify the location of each bin by retrieving a location identifier from the waste data received from the sensors. The sensors may be configured to capture the location of each bin via. GPS technology, for example. The DA computing device may use the location identifier included in the waste data, the recycling data, and/or the energy data to parse and/or perform a lookup within a database for users of the bins, and identify the users of the bins. The users may include, but are not limited to, customers using the bins, environmental authorities (e.g., government and/or non-government authorities), and waste collection providers (e.g., waste collection trucks and/or waste collection offices). For example, the DA computing device may be configured to transmit a waste level alert for one or more bins to a waste collection provider if certain waste levels are met. The DA computing device may include in the waste level alert, among other information, the location of each bin and the level of waste in each bin.

The DA computing device may be configured to receive from the sensors and/or the client devices a pick-up notification including at least one of a confirmation that a user is on the way to pick up the waste in the bins, the waste is being emptied from the bins, or the waste has been emptied from the bins.

Client devices may be computers that include a web browser or a software application, which enables client devices to access remote computer devices, such as the DA computing device, using the Internet or other network. More specifically, the client devices may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. Client devices may be any device capable of accessing the Internet including, but not limited to, a cellular phone, a smartphone, a tablet, a phablet, wearable electronics, smart watch, or other web-based connectable equipment or mobile devices.

In the exemplary embodiment, the DA computing device may be configured to analyze recycling data received recycle bins to determine whether the recycle bins are contaminated. Recycling contamination may occur when materials are sorted in the wrong recycling bin (e.g., placing a glass bottle into a mixed paper recycling bin for example), when materials are not properly cleaned (e.g., when food residue remains on a plastic yogurt container) or when non-recyclable items or materials (e.g., garbage, food waste, food-tainted items (such as: used paper plates or boxes, paper towels, or paper napkins), ceramics and kitchenware, windows and mirrors, plastic wrap, packing peanuts and bubble wrap, wax boxes, photographs, medical waste, polystyrene or Styrofoam™, hazardous chemicals and chemical containers, plastic toys or sporting goods equipment, foam egg cartons, wood, light bulbs, yard waste or garden tools, and other non-recyclable items or materials) are in recycle bins.

In response to determining that the recycle bins are contaminated, the DA computing device may determine the level of contamination of each contaminated bin. For example, the sensors may include at least one camera that captures images of the inner and/or outer sides of the recycle bins. The sensors may include the images in the recycling data and transmit the recycling data to the DA computing device, which may use detection technology (e.g., optical character recognition (OCR), chemical sensors, moisture sensors) to determine whether recycle bins are contaminated. For example, the DA computing device may use detection technology to identify a presence of liquid and/or food residue in the recycle bins, materials are sorted in the wrong recycling bin, and/or non-recyclable items or materials are in recycle bins (e.g., contaminated recycle bins).

In response to determining that the recycle bins are contaminated, the DA computing device may compute a level of contamination using detection technology. For example, the DA computing device may analyze/scan the images included in the recycling data to detect the level of liquid and/or food residues (e.g., contamination level) in each recycle bin. In some embodiments, the DA computing device may generate an alert (e.g., contamination alert) in response to determining that the recycle bins are contaminated. In other embodiments, the DA computing device may generate the contamination alert if the contamination level is below, meets, or exceeds a predefined threshold.

In the exemplary embodiment, once the contamination alert is generated, the DA computing device may flag each contaminated bin within a database as having an issued contamination alert, and transmit the contamination alert in real-time to client devices associated with users of the recycle bins. The DA computing device may include in the contamination alert, among other information, the contamination level of each recycle bin, the location of each recycle bin, and the type of liquid and/or food residues in each recycle bin. The DA computing device may be configured to receive from the sensors and/or the client devices a decontamination notification including at least one of a confirmation that a user is on the way to decontaminate the contaminated bins, the contaminated bins are being decontaminated, or the contaminated bins have been decontaminated.

The DA computing device may be further configured to instruct the sensors to open, keep open, close, or keep closed their corresponding bins in response to the DA computing device determining the type of waste (e.g., recyclable or non-recyclable waste) that is about to be placed in the bin. For example, the sensors may use one or more cameras to capture one or more images of the waste that is about to be placed in the bin, and transmit the images as recycling data to the DA computing device. The DA computing device may use OCR and/or any other image analysis to analyze the received images to determine the type of waste that is about to be placed in the bins. Once the DA computing device determines the type of waste, the DA computing device may compare the determined type of waste to a type of bin (e.g., recycle or non-recycle bin) associated with the sensors that transmitted the received images. In one example, the DA computing device may have previously stored in one or more databases sensor identifiers and their corresponding bin identifiers, each bin identifier identifying a bin and the type of bin. In this example, the DA computing device may retrieve the type of bin from the one or more databases based upon information included in the recycling data, such as one or more sensor identifiers identifying the sensors that transmitted the recycling data and one or more bin identifiers each identifying each bin coupled to the one more sensors. In another example, the DA computing device may retrieve the type of bin from the recycling data.

In the exemplary embodiment, once the DA computing device retrieves the type of bin, the DA computing device may be configured to compare the type of waste to the type of bin, and instruct the sensors, based upon the results of the comparison, whether to open, keep open, close, or keep closed their corresponding bins. That is, if the DA computing device determines that the type of waste is recyclable waste and the type of bin where the recyclable waste is about to be placed is a recycle bin, the DA computing device may instruct the sensors to open or keep open the recycle bin, and close or keep closed any non-recycle bins in the vicinity of the recycle bin. Conversely, if the DA computing device determines that the type of waste is recyclable waste and the type of bin where the recyclable waste is about to be placed is a non-recycle bin, the DA computing device may instruct the sensors to close or keep closed the non-recycle bin, and open or keep open any recycle bins in the vicinity of the non-recycle bin.

In another embodiment, the bins may include an electronic sign (e.g., e-sign) that may be instructed by, for example, the DA computing device to display notifications generated by the DA computing device. E-sings may vary in size dimensions and may include, but are not limited to, fluorescent signs, HID (high intensity displays), incandescent signs, LED signs, and neon signs. The notifications displayed on the e-signs may include "PLEASE DISPOSE OF THIS RECYCLABLE WASTE HERE" or "PLEASE DISPOSE OF THIS NON-RECYCLABLE WASTE HERE," on a recycling bin or a non-recycling bin, respectively.

The DA computing device may determine which notification to display on the e-sign based upon the results of the comparison between the type of waste and the type of bin, as described above. In one example, if the DA computing device determines that the type of waste is non-recyclable waste, the DA computing device may instruct an e-sign placed on a non-recycle bin to display "PLEASE DISPOSE OF THIS NON-RECYCLABLE WASTE HERE." In another example, if the DA computing device determines that the type of waste is recyclable waste, the DA computing device may instruct an e-sign placed on a recycle bin to display "PLEASE DISPOSE OF THIS RECYCLABLE WASTE HERE." In yet another embodiment, the bins may include an audio component that may be instructed by, for example, the DA computing device to audio stream via, for example, a speaker device, the notifications described above. In this embodiment, the bin may include the audio component or both the audio component and the electronic sign.

In the exemplary embodiment, the DA computing device may be configured to generate one or more maps including waste bins (e.g., non-recycle and/or recycle bins). In one embodiment, the DA computing device may generate the one or more maps using a received location of each bin from their corresponding sensors, The DA computing device may also generate the one or more maps by retrieving the received locations from one or more databases. In another embodiment, the DA computing device may generate the one or more maps by retrieving pre-programmed location information of each bin from the one or more databases. Once the one or more maps are generated, the DA computing device may be configured to transmit the one or more maps to one or more client devices associated with the users of the waste bins.

In the exemplary embodiment, the DA computing device may use the generated maps, the waste level alerts, and the contamination alerts to generate a route map for waste collection providers. The DA computing device may generate the route map by prioritizing locations of bins based upon the waste level alerts and the contamination alerts (e.g., bins with higher waste levels and higher levels of contamination than other bins are set in the route map to be collected first), thereby mitigating or eliminating unnecessary trips by waste collection providers to bin locations that do not require immediate attention (e.g., bins not being flagged with any type of alert).

In the exemplary embodiment, the DA computing device may be configured to generate and transmit a waste tutorial (WT) computer application to one or more client devices for use and display on the one or more client devices. The DA computing device may configure the WT computer application to receive and display the generated maps on the one or more client devices. The DA computing device may also configure to the WT computer application to provide instructions to users of the client devices on how to recyclable waste. In one example, the DA computing device may configure the WT computer application to receive user input (e.g., a picture and/or a description of an item that a user may throw away) from the one or more client devices and transmit the user input to the DA computing device. The DA computing device may analyze the user input using, for example, OCR and/or any other image analysis to determine the type of waste the item included in the user input.

In response to determining the type of waste, the DA computing device may transmit, in real-time, waste disposal instructions for the item (e.g., whether to dispose of the item in a recycle or a non-recycle bin) to the WT computer application included the one or more client devices. Once the waste disposal instructions are received by the WT computer application, the WT computer application may display the waste disposal instructions on the one or more client devices.

In another embodiment, the DA computing device may be configured to generate notifications and transmit the notifications to the WT computer application for display on the one or more client devices. The DA computing device may also be configured to transmit the generated notifications to e-signs (e.g., e-signs on bins, buildings, lands, and/or other locations) for display on the e-signs. The notifications may include recycling practices, bin locations, recycling day(s) alerts, non-recycling day(s) alerts, bulletins addressing recycling, and/or non-recycling user behavior trends based upon, for example, issued waste level alerts and/or contamination alerts, and/or other information that the users of bins may be concerned about.

In some embodiments, the DA computing device may be configured to build waste disposal models based upon identified or learned patterns of users, by using waste data and recycling data in combination with machine learning and/or artificial intelligence. For example, the DA computing device may use information included in received waste data, such as waste levels in bins; frequency that the waste levels are below, meet, and/or exceed a predefined threshold; number of waste collection days; bin locations; and/or other information that may gathered/collected from the sensors. The DA computing device may also use information included in received recycling data such as number and type of items that are disposed in the correct bin, number and type of items that are disposed in the incorrect bin, location of contaminated recycling bins, location of non-contaminated recycling bins, and/or other information that may gathered/collected from the sensors.

The DA computing device may use any built or generated waste disposal models to generate and transmit notifications to the WT computer application for display on the one or more client devices and/or to the e-signs for display on the e-signs. For example, these notifications may include indications of items that have been incorrectly recycled, ways to correctly recycle the items, and/or a link to a reward/point program that encourages users to correctly recycle the items. In some embodiments, the reward/point program is part of the WT computer application. In other embodiments, the reward/point program is separate from the WT computer application. In some embodiments, the DA computing device may instruct the reward/point program to accumulate points on a user account in response to the DA computing device building a waste disposal model reflecting a pattern of a user of the user account, where the pattern indicates recycling and waste management behavior consistent and/or inconsistent with waste disposal instructions.

In the exemplary embodiment, the DA computing device may be additionally or alternatively configured to collect energy data from electric devices or items (e.g., electric charging stations, electric vehicles, buildings, and other devices using energy) of interest to users via sensors located near, at, and/or in said electric devices. The energy data may include, but is not limited to, total energy required to fill one or more batteries of the electric devices, average energy consumption of an electric vehicle (e.g., per-mile or per-day consumption), charging frequency of the electric vehicle (e.g., number of times that the electric vehicle is charged in period of time, such as a day, week, month, etc.), an electric device identifier(e.g., a vehicle identifier, a charging station identifier, a building identifier, etc.), a user identifier, cost data (e.g., money spent on services performed on the electric device), average driving distance (e.g., mileage of the electric vehicle), driving locations, vehicle maintenance data (e.g., vehicle battery health level, time that takes to charge the battery, tire pressure level, oil level, and/or other information related to the maintenance of the electric vehicle), charging stations maintenance data (e.g., repairs and/or improvements performed to charging stations), building maintenance data (e.g., repairs and/or improvements performed to buildings), locations of one or more charging stations, price of energy at charging stations, cost of energy consumed by electric devices, total consumption of energy by the electric devices in a predefined time period, and/or telematics data (e.g., driving behavior of users of electric vehicles).

In one example, the electric devices include electric charging stations (also referred herein as to charging stations). These charging stations may be powered by power companies or electricity suppliers and/or alternative power technologies (e.g., solar power, wind power, etc.). The DA computing device may collect energy data from the charging station via energy meters, sensors located in and/or in proximity of the charging stations, computing devices in communication with the charging stations, and/or other devices configured to collect energy data from the charging stations. In another example, the electric devices are electric vehicles. In this example, the DA computing device may be configured to collect energy data directly from vehicles located in the charging stations and/or from one or more client devices of users of the vehicles.

In the exemplary embodiment, the DA computing device may use the energy data to build an individual risk profile for each user. For example, the individual risk profile may include driving information of a user, driving patterns of the user, energy consumption patterns of one or more electric devices associated with the user, and/or other information that may be suitable to assess the manner of driving and energy usage of the user. By building the individual risk profile, the DA computing device may determine an insurance plan that best fits the user (e.g., an insurance plan including information matching most of the information included in the individual risk profile of the user) by comparing the individual risk profile to one or more insurance plans included in insurance data received from one or more insurance servers.

The DA computing device may also determine whether a user is qualified to receive an insurance discount based upon the energy consumption patterns user usage of electric devices). The DA computing device may further determine a monthly insurance rate for the user based upon the energy consumption patterns (e.g., user usage of electric devices). The DA computing device may be configured to modify the insurance data to include the determined insurance plan, the insurance discount, and/or the monthly insurance rate, and to transmit the modified insurance data to the one or more client devices of the user and/or one or more insurance servers.

Additionally, the DA computing device may be configured to generate alerts including driving recommendations and/or alternative driving routes based upon the individual risk profile, and transmit the alerts to one or more client devices of the users. For example, the DA computing device may generate driving recommendations based upon common routes traveled by the user, where the common routes are determined by the DA computing device by using information from location data received from the one or more client devices of the users. Each driving recommendation may include one or more alternative routes and/or times of travel so that the duration and distance of trips made by the user are minimized (e.g., avoiding/mitigating traffic, constructions zones, etc.). The recommendations may also include public transportation modes and routes that may minimize the duration and distance of trips made by the user.

Further, the DA computing device may be configured to generate alerts including notifications indicating that at least a portion of the data included in the collected energy data is below, meets, or exceeds a predefined threshold. For example, the DA computing device may generate a battery health alert in response to comparing a battery heath level included in the collected energy data to a predefined threshold, and determining, based upon the comparison, that the battery health level is below a predefined threshold. The DA computing device may also generate other types of alerts using patterns of the energy data, comparing the data to predefined thresholds, and determining that the data is below, meets, or exceeds one or more predefined thresholds or meets other alert criteria. Once the alert is generated, the DA computing device may transmit the alert to one or more client devices of a user of the electric vehicle or other electric device associated with the energy data.

In the exemplary embodiment, the DA computing device may be configured to collect energy data from one or more electric vehicles charging in a charging station to determine the energy consumption level required to charge each electric vehicle in the charging station. Based upon the determination, the DA computing device may generate an alert including the energy consumption level required. In some embodiments, the DA computing device may be in communication with one or more computing devices associated with one or more electricity suppliers or power companies.

The DA computing device may transmit the alert to the one or more energy computing devices so that the one or more electricity suppliers are notify of the energy consumption level, and may supply more energy to the charging station if necessary. In other embodiments, the DA computing device may transmit the alert to the one or more energy computing devices and/or one or more client devices associated with users and/or operators of the charging stations.

In the exemplary embodiment, the DA computing device may generate maps including charging stations using location identifiers of charging stations that may be received from sensors located in the charging stations and/or preprogrammed within the DA computing device. The DA computing device may also generate these maps using energy data in combination with the location identifiers, generate station alerts (e.g., alerts including a list of recommended charging stations and/or the generated maps including the charging stations), and transmit the stations alerts to one or more client devices. For example, the DA computing device may generate a map including available charging stations and their corresponding charging times and energy prices.

Based upon the generated map, the DA computing device may generate a station alert including a list of recommended charging stations sorted by energy prices and charging times, and/or the generated maps including the charging stations. The DA computing device may transmit the generated maps and the alert to a user via a user's vehicle computing device and/or one or more client devices of the user.

In some embodiments, the DA computing device may be configured to generate and transmit an electric charging (EC) computer application to one or more client devices. The DA computing device may configure the EC computer application to enable users to make a payment, via the EC computer application included in one or more client devices associated with the user, for the energy charged at charging stations. The EC computer application may enable the one or more client devices to communicate with the charging stations, via wireless communication, to receive energy charging information that may be transmitted by the EC computer application to the DA computing device. The energy charging information may include an amount of energy loaded into an electric vehicle, price of energy loaded into the electric vehicle, time-stamp of payment, time duration of energy loaded into the electric vehicle, charging station identifier, charging station name, charging station address, and other information related to the energy loaded in to the electric vehicle.

The DA computing device may use the energy charging information to generate or build energy usage models for electric devices and/or users of the electric devices. The DA computing device may use the energy charging information to generate or build energy usage models based upon identified or learned energy usage patterns from analysis of the received energy charging information. The DA computing device may also transmit the energy usage models to the one or more client devices for display on the one or more client devices and/or one or more insurance servers. In addition, the DA computing device may configure the EC computer application to display generated maps and alerts on the one or more client devices of the users.

In alternative embodiments, the DA computing device may be configured to collect energy data from smart energy meters (e.g., electronic devices recording consumption of electric energy by electric devices and may communicate consumption information to electricity suppliers for monitoring and billing) in communication with electric devices, such as in charging stations and/or buildings. The collected energy data may include locations of the meters, demand of energy in said locations, and time of demand (e.g., no demand, low demand, and high demand times). The DA computing device may analyze the collected energy data to identify or learn energy usage patterns of the electric devices, and generate or building energy usage models for the electric devices based upon the identified or learned energy usage patterns. The DA computing device may transmit the energy usage models to one or more energy computing devices of one or more electricity suppliers or power companies, so that these suppliers or companies may optimize the management of energy supply.

In other embodiments, the DA computing device may be in communication with sensors located in buildings and charging stations. The DA computing device may configure the sensors to collect energy data including telematics data of the buildings and charging stations. The telematics data of the buildings and charging stations may include information corresponding to the usage of energy of the buildings and charging stations, respectively. The DA computing device may use the collected telematics data of the buildings and charging stations to build energy usage models for each building and each charging station based upon identified or learned energy usage patterns of each building and each charging station, respectively. The DA computing device may build these energy usage models in a similar fashion as described above with respect to the energy usage models built using energy data collected from smart energy meters.

Exemplary System for Enhancing Waste Disposal Using Sensor Technology

FIG. 1 illustrates a diagram of an exemplary computer system 100 for waste disposal, and alerting users in real-time of waste levels and contamination in waste bins. Computer system 100 may include a detection and alert (DA) computing device 107, sensor 103, client device 109, and database 111. Although one DA computing device 107 is shown in FIG. 1, in another embodiment, computer system 100 may include a plurality of DA computing devices 107, sensors 103, client devices 109, and databases 111. In the exemplary embodiment, DA computing device 107 may be in communication, via communications module 110, with plurality of sensors 103, one or more client devices 109, and database 111.

In the exemplary embodiment, client device 109 may generate user data 106 and location data 108 associated with the user and client device 109. Client device 109 may also transmit user data 106 and location data 108 to DA computing device 107. DA computing device 107 may be configured to use user data 106 to identify users of waste bins 101 and location data 108 to identify the location of users of waste bins 101 and/or to infer the locations of waste bins 101 when the users of waste bins 101 and/or client device 109 of the users are at least proximate to waste bins 101. DA computing device 107 may also be configured to store waste data 104, recycling data 105, user data 106, and location data 108 within database 111. DA computing device 107 may be also configured to retrieve waste data 104, recycling data 105, user data 106, and location data 108 from database 111. In some embodiments, database 111 may be stored remotely from DA computing device 107. In other embodiments, database 111 may be decentralized.

User data 106 for each user may include information of the user and the associated client device 109. Such information may include a user identifier, a client device identifier, a home address, a business address, a phone number, name(s) of the user, or the like. Location data 108 may include tracking device information of client device 109, such as global position system (GPS) data, radio frequency identification (RFID) data, radio tracking data, and cellphone triangulation data. Waste data 104 may include at least one of a level of the waste in waste bin 101; frequency that the waste levels are below, meet, and/or exceed a predefined threshold; number of waste collection days; location of bins 101; and/or other information that may gathered/collected from sensors 103. Recycling data 105 may include at least one of number and type of items that are disposed in the correct bin 101, number and type of items that are disposed in the incorrect bin 101, location of contaminated recycling bins 101, locations of the non-contaminated recycling bins 101, an/or other information that may gathered/collected from sensors 103.

In the exemplary embodiment, sensor 103 may transmit and receive sensor signals 102 to/from waste bin 101. Waste bin 101 may include recycle and non-recyclable waste bins. Sensor 103 may generate sensor data, such as waste data 104 and recycling data 105 associated with waste bin 101 based upon sensor signals 102. Sensor 103 may also transmit waste data 104 and recycling data 105 to DA computing device 107.

In the exemplary embodiment, DA computing device 107 may be configured to analyze waste data 104 to determine a level of waste in each bin (e.g., whether waste is overflowing, full, about to be full, or at any other level in the bin), generate a waste level alert 112 (e.g., a waste level alert) in real-time in response to determining that the level of waste in the bin 101 is below, meets, or exceeds a predefined threshold. In response to generating alert 112, DA computing device 107 may flag bin 101 within database 111 as having an issued alert 112, and transmit alert 112 in real-time to client devices 109 associated with users of bins 101. DA computing device 107 may identify the users of bins 101 and respective client devices 109 using user data 106 previously received from the client devices 109 associated with the users.

In the exemplary embodiment, DA computing device 107 may receive user data 106 in response to a user registering within computer system 100 and/or opting in to receive alerts 112. DA computing device 107 may use a location identifier included in waste data 104 and recycling data 105 to parse and/or perform a lookup within database 111 for users of bins 101, and identify the users of bins 101. The users may include, but are not limited to, customers using the bins, environmental authorities (e.g., government and/or non-government authorities), and waste collection providers (e.g., waste collection trucks and/or waste collection offices). For example, DA computing device 107 may be configured to transmit a waste level alert 112 for one or more bins 101 to a waste collection provider if certain waste levels are met in bins 101.

DA computing device 107 may include in waste level alert 112, among other information, the location of each bin 101 and the level of waste in each bin 101. DA computing device 107 may identify the location of each bin by retrieving said location from waste data 104 received from sensors 103. Sensors 103 may be configured to capture the location of each bin 101 via GPS technology, for example. DA computing device 107 may be configured to receive from sensors 103 and/or client devices 109 a pick-up notification including at least one of a confirmation that a user is on the way to pick up the waste in bins 101, the waste is being emptied from bins 101, or the waste has been emptied from bins 101.

In the exemplary embodiment, DA computing device 107 may be configured to analyze recycling data 105 to determine whether recycle bins 101 are contaminated. In response to determining that recycle bins 101 are contaminated, DA computing device 107 may determine the level of contamination of each contaminated bin 101. For example, sensors 103 may include at least one camera that captures images of the inner and/or outer sides of recycle bins 101. Sensors 103 may include the images in recycling data 105 and transmit recycling data 105 to DA computing device 107, which may use optical character recognition (OCR) to determine whether there is a presence of liquid and/or food residue in recycle bins 101 (e.g., contaminated recycle bins).

In response to determining that recycle bins 101 are contaminated, DA computing device 107 may compute a level of contamination using OCR. For example, DA computing device 107 may analyze/scan the images included in recycling data 105 to detect the level of liquid and/or food residues (e.g., contamination level) in each recycle bin 101. In some embodiments, DA computing device 107 may generate an alert 112 (e.g., contamination alert) in response to determining that recycle bins 101 are contaminated. In other embodiments, DA computing device 107 may generate contamination alert 112 if the contamination level is below, meets, or exceeds a predefined threshold.

In the exemplary embodiment, once contamination alert 112 is generated, DA computing device 107 may flag each contaminated bin 101 within database 111 as having an issued contamination alert 112, and transmit contamination alert 112 in real-time to client devices 109 associated with users of recycle bins 101. DA computing device 107 may include in contamination alert 112, among other information, the contamination level of each recycle bin 101, the location of each recycle bin 101, and the type of liquid and/or food residues in each recycle bin 101. DA computing device 107 may be configured to receive from sensors 103 and/or client devices 109 a decontamination notification including at least one of a confirmation that a user is on the way to decontaminate contaminated bins 101, contaminated bins 101 are being decontaminated, or contaminated bins 101 have been decontaminated.

DA computing device 107 may be further configured to instruct sensors 103 to open, keep open, close, or keep closed their corresponding bins 101 in response to DA computing device 107 determining the type of waste (e.g., recycle or non-recyclable waste) that is about to be placed in bins 101. For example, sensors 103 may use one or more cameras to capture one or more images of the waste that is about to be placed in the bin, and transmit the images within recycling data to DA computing device 107. DA computing device 107 may use OCR to analyze the received images to determine the type of waste that is about to be placed in the bin. Once DA computing device 107 determines the type of waste, DA computing device 107 may compare the determined type of waste to a type of bin (e.g., recycle or non-recycle bin) associated with sensors 103 that transmitted the received images.

In one example, DA computing device 107 may have previously stored in one or more databases 111 sensor identifiers and their corresponding bin identifiers, each bin identifier identifying a bin 101 and the type of bin. In this example, DA computing device 107 may retrieve the type of bin from one or more databases 111 based upon information included in recycling data 105, such as one or more sensor identifiers identifying sensors 103 that transmitted recycling data 105 and one or more bin identifiers each identifying each bin 101 coupled to one more sensors 103. In another example, DA computing device 107 may retrieve the type of bin from recycling data 105.

In the exemplary embodiment, once DA computing device 107 retrieves the type of bin, DA computing device 107 may be configured to compare the type of waste to the type of bin, and instructs sensors 103, based upon the results of the comparison, whether to open, keep open, close, or keep closed their corresponding bins 101. That is, if DA computing device 107 determines that the type of waste is recyclable waste and the type of bin where the recyclable waste is about to be placed is a recycle bin 101, DA computing device 107 may instruct sensors 103 to open or keep open recycle bin 101, and close or keep closed any non-recycle bins 101 in the vicinity of recycle bin 101. Conversely, if DA computing device 107 determines that the type of waste is recyclable waste and the type of bin where the recyclable waste is about to be placed is a non-recycle bin 101, DA computing device 107 may instruct sensors 103 to close or keep closed non-recycle bin 101, and open or keep open any recycle bins 101 in the vicinity of non-recycle bin 101.

In another embodiment, bins 101 may include an electronic sign (e.g., e-sign) that may be instructed by, for example, DA computing device 107 to display notifications, The notification may include "PLEASE DISPOSE OF THIS RECYCLABLE WASTE HERE" or "PLEASE DISPOSE OF THIS NON-RECYCLABLE WASTE HERE," on a recycling bin 101 or a non-recycling bin 101, respectively. DA computing device 107 may determine which notification to display on the e-sign based upon the results of the comparison between the type of waste and the type of bin, as described above. In one example, if DA computing device 107 determines that the type of waste is non-recyclable waste, DA computing device 107 may instruct an e-sign placed on a non-recycle bin 101 to display "PLEASE DISPOSE OF THIS NON-RECYCLABLE WASTE HERE." In another example, if DA computing device 107 determines that the type of waste is recyclable waste, DA computing device 107 may instruct an e-sign placed on a recycle bin 101 to display "PLEASE DISPOSE OF THIS RECYCLABLE WASTE HERE."

In the exemplary embodiment, DA computing device 107 may be configured to generate a map including non-recycle and/or recycle bins 101. In one embodiment, DA computing device 107 may generate the map using the received location of each bin 101 from their corresponding sensors 103. DA computing device 107 may also generate the map by retrieving the received locations from one or more databases 111. In another embodiment, DA computing device 107 may generate the map by retrieving pre-programmed location information of each bin 101 from the one or more databases 111.

In the exemplary embodiment, DA computing device 107 may use the generated maps, waste level alerts 112, and contamination alerts 112 to generate a route map for waste collection providers. DA computing device 107 may generate the route map by prioritizing locations of bins 101 based upon waste level alerts 112 and contamination alerts 112, thereby mitigating or eliminating unnecessary trips by waste collection providers to bin locations that do not require immediate attention (e.g., bins not being flagged with any type of alert).

In the exemplary embodiment, DA computing device 107 may be configured to generate and transmit a waste tutorial (WT) computer application to one or more client devices 109. DA computing device 107 may configure the WT computer application to provide instructions to users of client devices 109 on how to recyclable waste. in one example, DA computing device 107 may configure the WT computer application to receive user input (e.g., a picture and/or a description of an item that a user may throw away) from one or more client devices 109 and transmit the user input to DA computing device 107. DA computing device 107 may analyze the user input using, for example, OCR to determine the type of waste the item included in the user input.

In response to determining the type of waste, DA computing device 107 may transmit in real-time waste disposal instructions for the item (e.g., whether to dispose of the item in a recycle or a non-recycle bin) to the WT computer application included one or more client devices 109. Once the waste disposal instructions are received by the WT computer application, the WT computer application may display the waste disposal instruction on one or more client devices 109.

In another embodiment, DA computing device 107 may be configured to transmit notifications to the WT computer application for display on one or more client devices 109. DA computing device 107 may also be configured to transmit the notifications to e-signs (e.g., e-signs on bins, buildings, lands, and/or other locations) for display on the e-signs. The notifications may include recycling practices, bin locations, recycling day(s) alerts, non-recycling day(s) alerts, bulletins addressing recycling, and/or non-recycling user behavior trends based upon, for example, issued waste level alerts 112 and/or contamination alerts 112, and/or other information that the users of bins 101 may be concerned about.

In some embodiments, DA computing device 107 may be configured to build waste disposal models based upon identified or learned energy usage patterns of users, by using waste data 104 and recycling data 105 in combination with machine learning and/or artificial intelligence. For example, DA computing device 107 may use information included in waste data 104, such as waste levels in bins 101; frequency that the waste levels are below, meet, and/or exceed a predefined threshold; number of waste collection days; bin locations; and/or other information that may gathered/collected from sensors 103. DA computing device 107 may also use information included in recycling data 105 such as number and type of items that are disposed in the correct bin, number and type of items that are disposed in the incorrect bin, location of contaminated recycling bins, location of non-contaminated recycling bins, an/or other information that may gathered/collected from sensors 103.

DA computing device 107 may use waste disposal models to generate and transmit notifications to the WT computer application for display on one or more client devices 109 and/or to the e-signs for display on the e-signs. For example, these notifications may include items that have been incorrectly recycled, ways to correctly recycle the items, and/or a link to a reward/point program that encourages users to correctly recycle the items.

In some embodiments, the reward/point program is part of the WT computer application. In other embodiments, the reward/point program is separate from the WT computer application. In some embodiments, DA computing device 107 may instruct the reward/point program to accumulate points on a user account in response to DA computing device 107 building a waste disposal model reflecting a pattern of a user of the user account, where the pattern indicates recycling and waste management behavior consistent and/or inconsistent with waste disposal instructions.

Figure 2:
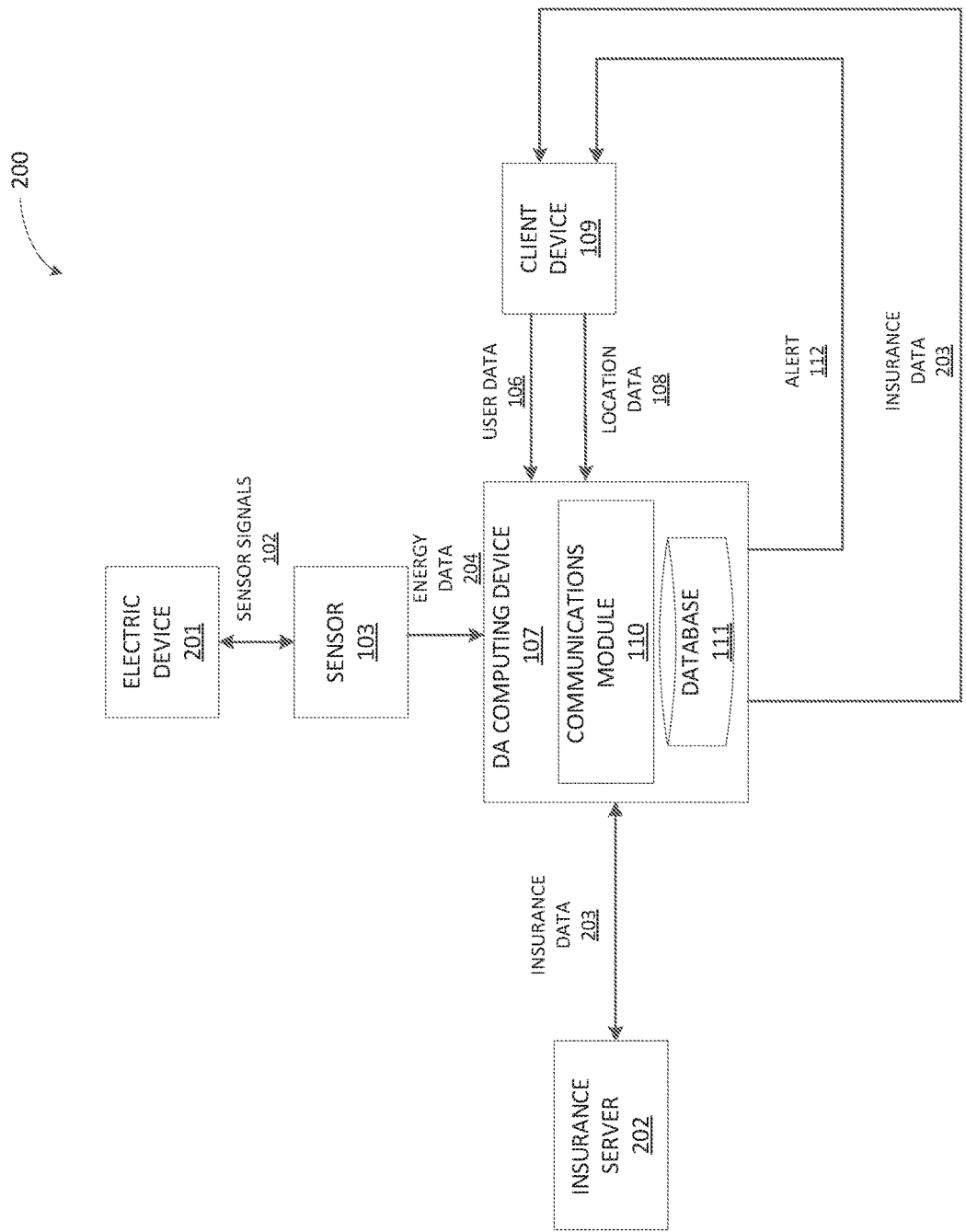
FIG. 2 illustrates a diagram of an exemplary computer system for enhancing energy efficiency, and alerting users in real-time of energy levels corresponding to electric devices.

Exemplary System for Energy Efficiency Using Sensor and Alternative Power Technologies FIG. 2 illustrates a diagram of an exemplary computer system 200 for enhancing energy efficiency, and alerting users in real-time of energy levels corresponding to electric devices (e.g., electric charging stations, electric vehicles, buildings, and other devices using energy) of interest to the users. Computer system 100 may include detection and alert (DA) computing device 107, sensor 103, client device 109, insurance provider server 202, and database 111. Computer system 100 may also include a plurality of DA computing devices 107, sensors 103, client devices 109, databases 111, and insurance provider servers 202. In the exemplary embodiment, DA computing device 107 may be in communication, via communications module 110, with sensor 103, client device 109, database 111, and insurance provider server 202.

In the exemplary embodiment, sensor 103 may transmit and receive sensor signals 102 to/from electric device 201. Electric device 201 may include, among other devices using energy, electric charging stations, electric vehicles, and buildings. Sensor 103 may generate sensor data, such as energy data 204 associated with electric device 201 based upon sensor signals 102. Sensor 103 may also transmit energy data 204 to DA computing device 107.

In the exemplary embodiment, client device 109 may generate user data 106 and location data 108 associated with the user and client device 109. Client device 109 may also transmit user data 106 and location data 108 to DA computing device 107. DA computing device 107 may be configured to store energy data 204, user data 106, and location data 108 within database 111. DA computing device 107 may be also configured to retrieve energy data 204, user data 106, and location data 108 from database 111. In some embodiments, database 111 may be stored remotely from DA computing device 107. In other embodiments, database 111 may be decentralized.

User data 106 for each user may include information of the user and the associated client device 109. Such information may include a user identifier, a client device identifier, a home address, a business address, a phone number, name(s) of the user, or the like. Location data 108 may include tracking device information of client device 109, such as global position system (GPS) data, radio frequency identification (RFID) data, radio tracking data, and cellphone triangulation data.

Energy data 204 may include, but is not limited to, total energy required to fill one or more batteries of electric devices 201, average mile energy consumption of an electric vehicle, charging frequency of the electric vehicle (e.g., number of times that the vehicle is charged in period of time, such as a day, week, month, etc.), an electric device identifier (e.eg, a vehicle identifier, a charging station identifier, a building identifier, etc.), a user identifier, cost data (e.g., money spent on services performed to electric device 201), average driving distance (e.g., mileage of the vehicle), driving locations, vehicle maintenance data (e.g., vehicle battery health level, time that takes to charge the battery, tire pressure level, oil level, and/or other information related to the maintenance of the vehicle), charging stations maintenance data (e.g., repairs and/or improvements performed to charging stations), building maintenance data (e.g., repairs and/or improvements performed to buildings), locations of one or more charging stations, price of energy at charging stations, cost of energy consumed by electric devices, total consumption of energy by electric devices 201 in a predefined time period, and/or telematics data (e.g., driving behavior of users of electric vehicles, energy usage patterns in charging stations and buildings, etc.).

In the exemplary embodiment, DA computing device 107 may identify the users of electric devices 201 and respective client devices 109 using user data 106 previously received from the client devices 109 associated with the users. In the exemplary embodiment, DA computing device 107 may receive user data 106 in response to a user registering within computer system 200 and/or opting in to receive alerts 112 and/or insurance data 203. DA computing device 107 may use a location identifier included in energy data 204 to parse and/or perform a lookup within database 111 for users of electric device 201, and identify the users of electric devices 201.

In one example, electric devices 201 are electric charging stations (also referred herein as to charging stations). These charging stations may be powered by power companies or electricity suppliers and/or alternative power technologies (e.g., solar power, wind power, etc.). In another example, electric devices 201 are electric vehicles. In this example, DA computing device 107 may be configured to collect energy data 204 directly from vehicles located in the charging stations and/or one or more client devices 109 of users of the vehicles.

In the exemplary embodiment, DA computing device 107 may use energy data 204 to build an individual risk profile for each user. For example, the individual risk profile may include driving information of a user, driving patterns of the user, energy consumption patterns of one or more electric devices associated with the user, and/or other information that may be suitable to assess the manner of driving and energy usage of the user.

By building the individual risk profile, DA computing device 107 may determine an insurance plan that best fits the user (e.g., an insurance plan including information matching most of the information included in the individual risk profile of the user) by comparing the individual risk profile to one or more insurance plans included in insurance data 203 received from one or more insurance servers 202. DA computing device 107 may also determine whether a user is qualified to receive an insurance discount based upon the energy consumption patterns (e.g., user usage of electric devices). DA computing device 107 may further determine a monthly insurance rate for the user based upon the energy consumption patterns (e.g., user usage of electric devices). DA computing device 107 may be configured to modify insurance data 203 to include the determined insurance plan, the insurance discount, and/or the monthly insurance rate, and to transmit modified insurance data 203 to one or more client devices 109 of the user and/or one or more insurance servers 202.

Additionally, DA computing device 107 may be configured to generate alerts 112 including driving recommendations and/or alternative driving routes based upon the individual risk profile, and transmit alerts 112 to one or more client devices 109 of the users. For example, IDA computing device 107 may generate driving recommendations based upon common routes traveled by the user. Each driving recommendation may include one or more alternative routes and/or times of travel so that the duration and distance of trips made by the user are minimized (e.g., avoiding/mitigating traffic, constructions zones, etc.). The recommendations may also include public transportation modes and routes that may minimize the duration and distance of trips made by the user.

Further, DA computing device 107 may be configured to generate alerts 112 including notifications indicating that at least a portion of the data included in the collected energy data 204 is below, meets, or exceeds a predefined threshold. For example, DA computing device 107 may generate a battery health alert in response to comparing a battery heath level to a predefined threshold, and determining, based upon the comparison, that the battery health level is below a predefined threshold. DA computing device 107 may also generate other types of alerts 112 using other patterns of energy data 204, comparing the data to predefined thresholds, and determining that the data is below, meets, or exceeds one or more predefined thresholds or meets other alert criteria. Once the alert is generated, DA computing device 107 may transmit alert 112 to one or more client devices 109 of a user of the electric vehicle or other electric device associated with energy data 204.

In the exemplary embodiment, DA computing device 107 may be configured to collect energy data 204 from one or more electric vehicles charging in a charging station to determine the energy consumption level required to charge each electric vehicle in the charging station. Based upon the determination, IDA computing device 107 may generate alert 112 including the energy consumption level required. In some embodiments, DA computing device 107 may be in communication with one or more computing devices associated with one or more electricity suppliers or power companies. DA computing device 107 may transmit alert 112 to the one or more energy computing devices so that the one or more electricity suppliers are notify of the energy consumption level, and may supply more energy to the charging station if necessary. In other embodiments, DA computing device 107 may transmit alert 112 to the one or more energy computing devices and/or one or more client devices 109 associated with users and/or operators of the charging stations.

In the exemplary embodiment, DA computing device 107 may generate maps of charging stations using location identifiers of charging stations that may be received from sensors located in the charging stations and/or pre-programmed within DA computing device 107. DA computing device 107 may also generate these maps using energy data 204 in combination with the location identifiers, generate alerts 112 (e.g., alerts including a list of recommended charging stations and/or the generated maps including the charging stations), and transmit the alerts 112 to one or more client devices 109. For example, DA computing device 107 may generate a map including available charging stations and their corresponding charging times and energy prices. Based upon the generated map, DA computing device 107 may generate alert 112 including a list of recommended charging stations sorted by energy prices and charging times, and/or the generated maps including the charging stations. DA computing device 107 may transmit the generated maps and alert 112 to a user via a user's vehicle computing device and/or one or more client devices 109 of the user.

In some embodiments, DA computing device 107 may be configured to generate and transmit an electric charging (EC) computer application to one or more client devices 109. DA computing device 107 may configure the EC computer application to enable users to make a payment, via the EC computer application, for the energy charged at charging stations. DA computing device 107 may also configure the EC computer application to display generated maps and alerts 112 on one or more client devices 109 of the users.

In alternative embodiments, DA computing device 107 may be configured to collect energy data 204 from smart energy meters (e.g., electronic devices recording consumption of electric energy by electric devices and may communicate consumption information to electricity suppliers for monitoring and billing) in communication with electric devices 201, such as in charging stations and/or buildings. Collected energy data 204 may include locations of the meters, demand of energy in said locations, and time of demand (e.g., no demand, low demand, and high demand times). DA computing device 107 may analyze collected energy data 204 to identify or learn energy usage patterns of electric devices 201, and generate or building energy usage models for electric devices 201 based upon the identified or learned energy usage patterns. DA computing device 107 may transmit the energy usage models to one or more energy computing devices of one or more electricity suppliers or power companies, so that these suppliers or companies may optimize the management of energy supply.

In other embodiments, DA computing device 107 may be in communication with sensors located in buildings and charging stations. DA computing device 107 may configure the sensors to collect energy data 204 including telematics data of the buildings and charging stations. The telematics data of the buildings and charging stations may include information corresponding to the usage of energy of the buildings and charging stations, respectively. DA computing device 107 may use the collected telematics data of the buildings and charging stations to build energy usage patterns for each building and each charging station. DA computing device 107 may build these energy usage patterns in a similar fashion as described above with respect to the energy usage patterns built using energy data collected from smart energy meters.

Exemplary Server Device

Figure 3:
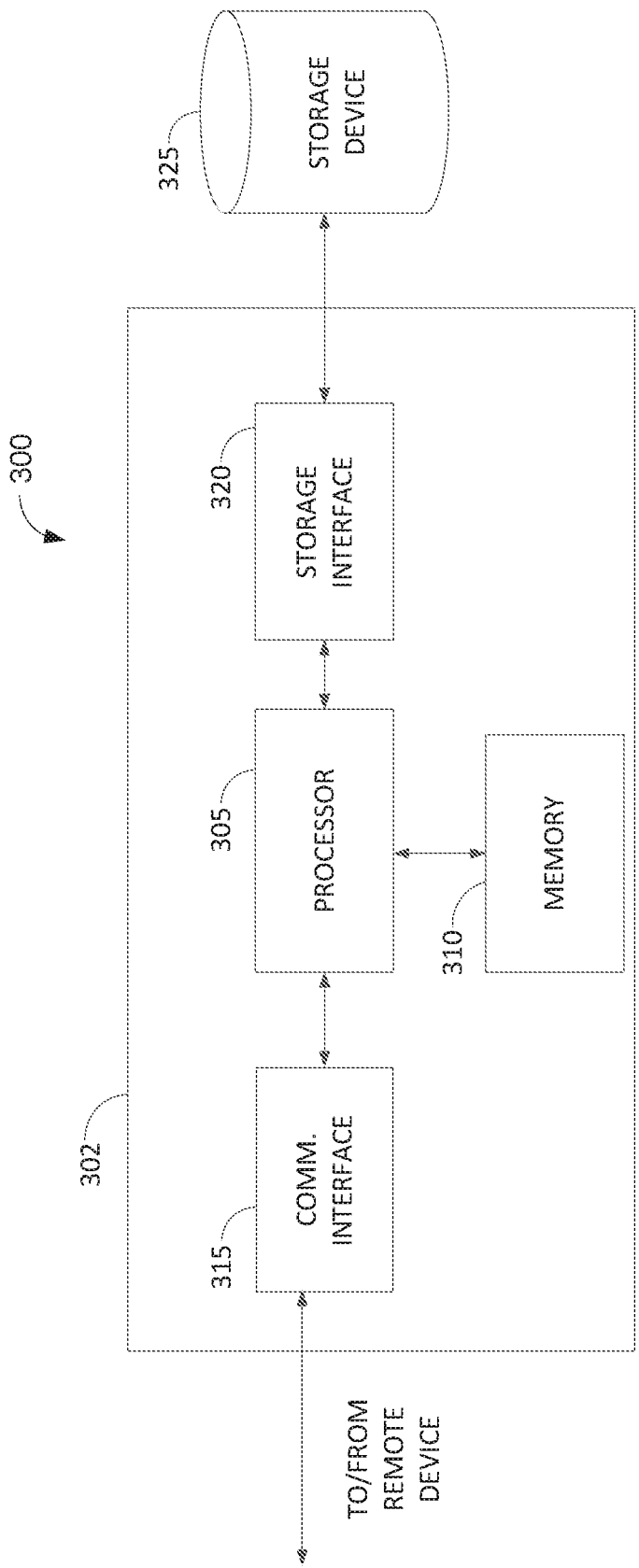
FIG. 3 depicts an exemplary configuration of an exemplary server computer device, in accordance with one embodiment of the present disclosure.

FIG. 3 depicts an exemplary configuration 300 of an exemplary server computer device 302, in accordance with one embodiment of the present disclosure. Server computer device 302 may include, but is not limited to, detection and alert (DA) computing device 107 (shown in FIGS. 1 and 2) and insurance provider server 202 (shown in FIG. 2). Server computer device 302 may include a processor 305 for executing instructions. Instructions may be stored in a memory area 310. Processor 305 may include one or more processing units (e.g., in a multi-core configuration).

Processor 305 may be operatively coupled to a communication interface 315 such that server computer device 302 may be capable of communicating with a remote device such as another server computer device 302 or a user computing device, such as client device 109 (shown in FIGS. 1 and 2). For example, communication interface 315 may receive requests from or transmit requests to client device 109 via the Internet.

Processor 305 may also be operatively coupled to a storage device 325. Storage device 325 may be any computer-operated hardware suitable for storing and/or retrieving data, such as, but not limited to, data associated with database 111 (shown in FIGS. 1 and 2). In some embodiments, storage device 325 may be integrated in server computer device 302. For example, server computer device 302 may include one or more hard disk drives as storage device 325. In other embodiments, storage device 325 may be external to server computer device 302 and may be accessed by a plurality of server computer devices 302. For example, storage device 325 may include a storage area network (SAN), a network attached storage (NAS) system, and/or multiple storage units such as hard disks and/or solid state disks in a redundant array of inexpensive disks (RAID) configuration.

In some embodiments, processor 305 may be operatively coupled to storage interface 320 via a storage interface 320. Storage interface 320 may be any component capable of providing processor 305 with access to storage interface 320. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage interface 320.

Processor 305 executes computer-executable instructions for implementing aspects of the disclosure, In some embodiments, processor 305 may be transformed into a special purpose microprocessor by executing computer-executable instructions or by otherwise being programmed.

Exemplary User Computer Device

Figure 4:
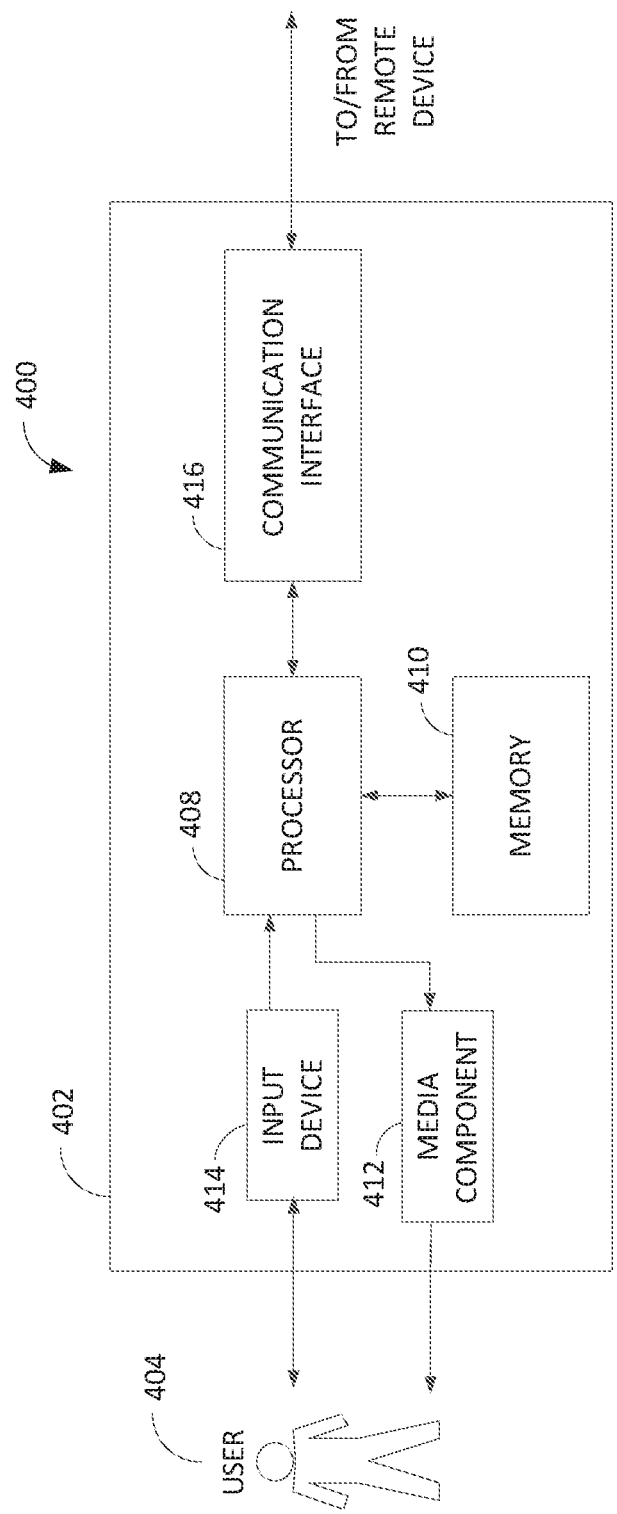
FIG. 4 illustrates an exemplary configuration of an exemplary user computing device, in accordance with one embodiment of the present disclosure.

FIG. 4 illustrates an exemplary configuration 400 of an exemplary user computing device 402. In some embodiments, user computing device 402 may be in communication with a detection and alert (DA) computing device (such as DA computing device 107, shown in FIGS. 1 and 2). User computing device 402 may be representative of, but is not limited to client device 109 (shown in FIGS. 1 and 2). For example, user computing device 402 may be a smartphone, tablet, smartwatch, wearable electronic, laptop, desktop, vehicle computing device, or another type of computing device associated with a user 404.

User computer device 402 may be operated by user 404 to interact with DA computing device 107. User computer device 402. may receive input from user 404 via an input device 414. User computer device 402 includes a processor 408 for executing instructions. In some embodiments, executable instructions may be stored in a memory area 410. Processor 408 may include one or more processing units (e.g., in a multi-core configuration). Memory area 410 may be any device allowing information such as executable instructions and/or transaction data to be stored and retrieved. Memory area 410 may include one or more computer-readable media.

User computer device 402 also may include at least one media output component 412 for presenting information to user 404. Media output component 412. may be any component capable of conveying information to user 404. In some embodiments, media output component 412 may include an output adapter (not shown), such as a video adapter and/or an audio adapter. An output adapter may be operatively coupled to processor 408 and operatively coupleable to an output device, such as a display device (e.g., a cathode ray tube (CRT), liquid crystal display (LCD), light emitting diode (LED) display, or "electronic ink" display) or an audio output device (e.g., a speaker or headphones).

In some embodiments, media output component 412 may be configured to present a graphical user interface (e.g., a web browser and/or a client application) to user 404. A graphical user interface may include, for example, social insurance group activity, a waste tutorial (WT) computer application, an electric charging (EC) computer application, and/or a wallet application for managing payment information such as cash and/or cryptocurrency payment methods.

In some embodiments, user computer device 402 may include input device 414 for receiving input from user 404. User 404 may use input device 414 to, without limitation, interact with DA computing device 107 (e.g., using a computer application), or any of the computer devices discussed elsewhere herein. Input device 414 may include, for example, a keyboard, a pointing device, a mouse, a stylus, and/or a touch sensitive panel (e.g., a touch pad or a touch screen). A single component, such as a touch screen, may function as both an output device of media output component 412 and input device 414. User computer device 402 may further include at least one sensor, including, for example, a gyroscope, a position detector, a biometric input device, and/or an audio input device. In the exemplary embodiment, data collected by user computer device 402 may, but not limited to, include user data 106 (shown in FIGS. 1 and 2) and/or location data 108 (shown in FIGS. 1 and 2).

User computer device 402 may also include a communication interface 416, communicatively coupled to any of DA computing device 107 and/or insurance provider server 202 (shown in FIG. 2). Communication interface 416 may include, for example, a wired or wireless network adapter and/or a wireless data transceiver for use with a mobile telecommunications network.

Stored in memory area 410 may be, for example, computer-readable instructions for providing a user interface to user 404 via media output component 412 and, optionally, receiving and processing input from input device 414. The user interface may include, among other possibilities, a web browser, and/or a client application. Web browsers enable users, such as user 404, to display and interact with media and other information typically embedded on a web page or a website hosted by, for example, DA computing device 107. A client application may allow user 404 to interact with, for example, any of DA computing device 107 and/or insurance provider server 202. For example, instructions may be stored by a cloud service and the output of the execution of the instructions sent to the media output component 412.

Exemplary Embodiments and Functionality

Figure 5:
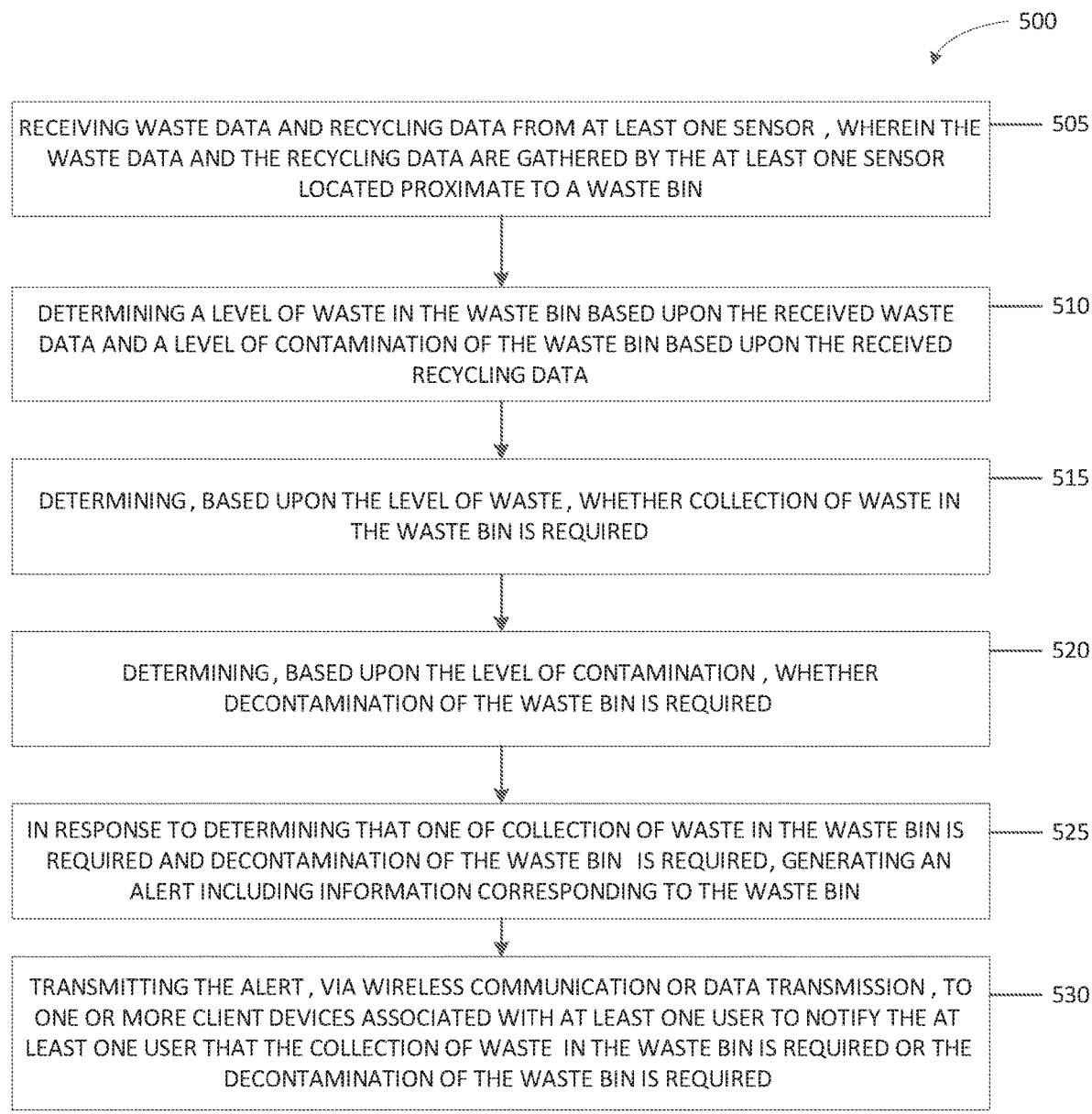
FIG. 5 illustrates a flow chart of an exemplary computer-implemented method for waste disposal, and alerting users in real-time of waste levels and contamination in waste bins using the computer system shown in FIG. 1.

FIG. 5 illustrates a flow chart of an exemplary computer-implemented method 500 for waste disposal, and alerting users in real-time of waste levels and contamination in waste bins using computer system 100 shown in FIG. 1. Method 500 may be implemented by a computing device, for example DA computing device 107 (shown in FIG. 1). In the exemplary embodiment, DA computing device 107 may be in communication with one or more sensors 103 and one or more client devices 109 (all shown in FIG. 1).

In the exemplary embodiment, method 500 may include receiving 505 waste data 104 and recycling data 105 from at least one sensor 103, wherein waste data 104 and recycling data 105 are gathered by at least one sensor 103 located proximate to a waste bin 101 (all shown in FIG. 1). Method 500 may also include determining 510 a level of waste in waste bin 101 based upon the received waste data 104, and a level of contamination of waste bin 101 based upon the received recycling data 105. Method 500 may further include determining 515, based upon the level of waste, whether collection of waste in waste bin 101 is required, and determining 520, based upon the level of contamination, whether decontamination of waste bin 101 is required.

In addition, method 500 may include in response to determining that one of collection of waste in waste bin 101 is required and decontamination of waste bin 101 is required, generating 525 an alert 112 (shown in FIG. 1) including information corresponding to waste bin 101. Method 500 may also include transmitting 530 alert 112, via wireless communication or data transmission, to one or more client devices 109 (shown in FIG. 1) associated with at least one user to notify the at least one user that the collection of waste in waste bin 101 is required or the decontamination of waste bin 101 is required.

Figure 6:
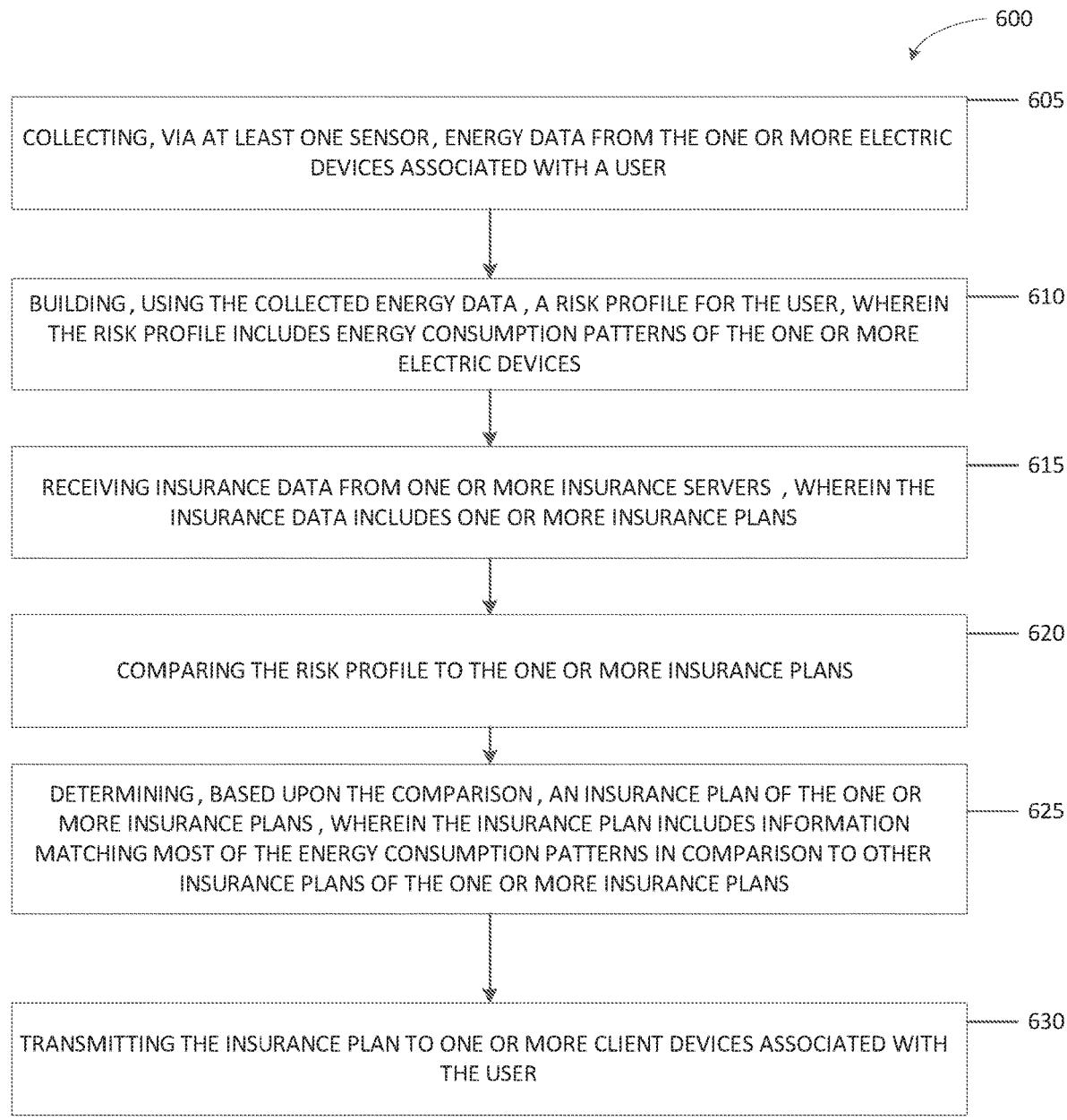
FIG. 6 illustrates a flow chart of an exemplary computer-implemented method for enhancing energy efficiency, and alerting users in real-time of energy levels corresponding to electric devices using the computer system shown in FIG. 2.

FIG. 6 illustrates a flow chart of an exemplary computer-implemented method 600 for enhancing energy efficiency, and alerting users in real-time of energy levels corresponding to electric devices using computer system 200 shown in FIG. 2. Method 600 may be implemented by a computing device, for example DA computing device 107 (shown in FIG. 2). In the exemplary embodiment, DA computing device 107 may be in communication with one or more sensors 103, one or more client devices 109, and one or more insurance provider servers 202 (all shown in FIG. 2).

In the exemplary embodiment, method 600 may include collecting 605, via at least one sensor 103, energy data 204 from one or more electric devices 201 associated with a user. Method 600 may also include building 610, using collected energy data 204, a risk profile for the user. The risk profile may include energy consumption patterns of one or more electric devices 201.

Method 600 may further include receiving 615 insurance data 203 from one or more insurance servers 202, where insurance data 203 may include one or more insurance plans, and comparing 620 the risk profile to the one or more insurance plans. In addition, method 600 may include determining 625, based upon the comparison, an insurance plan of the one or more insurance plans, where the insurance plan may include information matching most of the energy consumption patterns in comparison to other insurance plans of the one or more insurance plans. Method 600 may also include transmitting 630 the insurance plan to one or more client devices 109 associated with the user.

The computer systems discussed herein may include additional, less, or alternate functionality, including that discussed elsewhere herein. In addition, the methods discussed herein may include additional, less, or alternate actions, including those discussed elsewhere herein.

Machine Learning & Other Matters

The computer-implemented methods discussed herein may include additional, less, or alternate actions, including those discussed elsewhere herein. The methods may be implemented via one or more local or remote processors, transceivers, servers, and/or sensors, and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

A processor or a processing element may employ artificial intelligence and/or be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as image data, text data, and/or numerical analysis. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs. In one embodiment, machine learning techniques may be used to extract data about the computer device, the user of the computer device, driver and/or vehicle, documents to be provided, the model being simulated, home owner and/or home, buyer, geolocation information, image data, home sensor data, and/or other data.

Based upon these analyses, the processing element may learn how to identify characteristics and patterns that may then be applied to training models, analyzing sensor data, authentication data, image data, mobile device data, and/or other data.

Exemplary Multi-Comparment Waste Bin Embodiments

Figure 7:
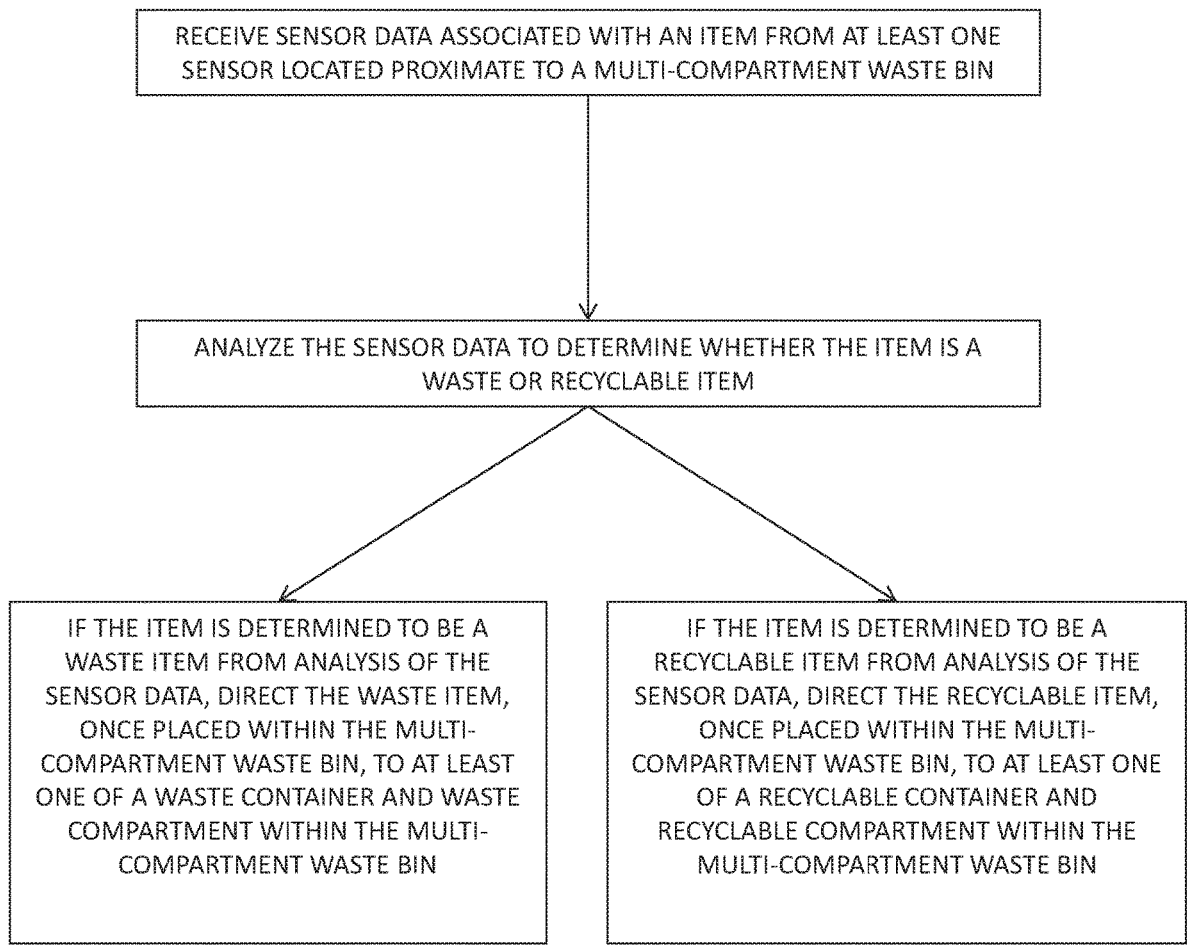
FIG. 7 illustrates a flow chart of an exemplary computer-implemented method for directing waste and recyclables to corresponding bins within a multi-compartment waste bin.
Figure 8:
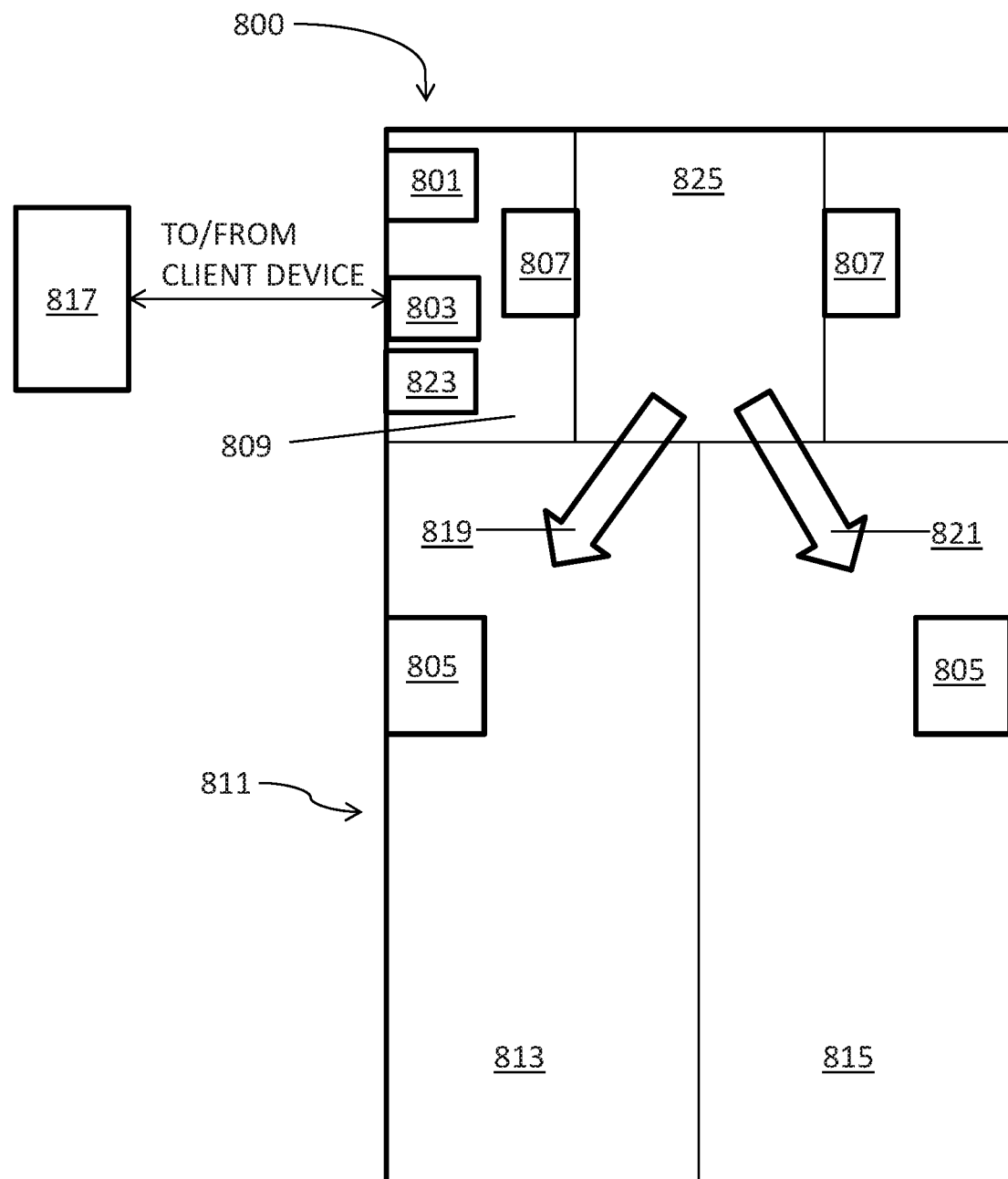
FIG. 8 illustrates an exemplary configuration of a multi-compartment waste bin system in accordance with one embodiment of the present disclosure.

FIG. 7 illustrates a flow chart of an exemplary computer-implemented method for directing waste and recyclables to corresponding bins within a multi-compartment waste bin system. FIG. 8 illustrates an exemplary configuration of the multi-compartment waste bin system.

More specifically, FIG. 8 illustrates an exemplary multi-compartment waste bin system 800 for enhancing waste disposal. System 800 includes a computer system 809 and a multi-compartment waste bin 811. System 800 improves waste disposal by directing waste 819 and recyclables 821 deposited in a deposit area 825 to corresponding compartments 813 and 815 within multi-compartment waste bin 811. Computer system 809 may include at least one local or remote processor 803 and/or associated transceiver in communication with at least one memory device 823 and at least one sensor 807. Processor 803 and/or associated transceiver may be programmed to: (1) receive sensor data associated with an item from sensor 807, wherein the sensor data is gathered or generated by sensor 807 located proximate to deposit area 825 and multi-compartment waste bin 811; (2) analyze the sensor data to determine whether the item is a waste item 819 or a recyclable item 821 (such as by inputting the sensor data into a machine learning model, module, algorithm, or program, collectively 801, that is trained to identify whether an item is a waste item or a recyclable from input sensor data); (3) if the item is determined to be a waste item 819 from analysis of the sensor data, direct waste item 819, once placed within deposit area 825 of multi-compartment waste bin 811, to a waste container or waste compartment 813 within multi-compartment waste bin 811; and/or (4) if the item is determined to be a recyclable item 821 from analysis of the sensor data, direct recyclable item 821, once placed within deposit area 825 of multi-compartment waste bin 811, to a recyclable container or recyclable compartment 815 within multi-compartment waste bin 811 to facilitate separation of waste 819 and recyclables 821 into dedicated waste containers 813 and recyclable containers 815, and the collection of recyclable items. Computer system 809 may include additional, less, or alternate features, including those discussed elsewhere herein.

For instance, the processor 803 and/or associated transceiver may be further programmed to: (i) determine, based upon the level of waste detected by a level sensor 805, whether collection of waste 819 in waste container or waste compartment 813 within multi-compartment waste bin 811 is required (such as if the level of waste has reached a predetermined threshold or level); (ii) in response to determining that one of collection of waste 819 in waste container or waste compartment 813 within multi-compartment waste bin 811 is required, generate an alert including information corresponding to multi-compartment waste bin 811; and/or (iii) transmit the alert, via wireless communication or data transmission, to one or more client devices 817 associated with at least one user to notify the at least one user that the collection of waste in waste container or waste compartment 813 within multi-compartment waste bin 811 is required.

Processor 803 and/or associated transceiver may be further programmed to: (i) determine, based upon the level of recyclables detected by level sensor 805, whether collection of recyclables 821 in recyclable container or recyclable compartment 815 within multi-compartment waste bin 811 is required (such as if the level of recyclables has reached a predetermined threshold or level); (ii) in response to determining that one of collection of recyclables 821 in recyclables container or recyclables compartment 815 within multi-compartment waste bin 811 is required, generate an alert including information corresponding to multi-compartment waste bin 811; and/or (iii) transmit the alert, via wireless communication or data transmission, to one or more client devices 817 associated with at least one user to notify the at least one user that the collection of recyclables in recyclables container or recyclables compartment 815 within multi-compartment waste bin 811 is required.

Sensor 807 may be a digital camera, and the sensor data may include digital image data. Processor 803 may be further programmed to: analyze the sensor data to determine whether the item associated with the sensor data is plastic, aluminum, glass, or cardboard. For instance, the sensor data may be input into machine learning model, module, program, or algorithm 801 that is trained to identify material type of an item, such as plastic, aluminum, glass, cardboard, and/or paper from sensor data, including image data.

Multi-compartment waste bin system 800 may be configured with a movable lid or flap, and processor 803 may be further programmed to: move the movable lid or flap (not shown) so as to direct waste item 819, once placed within deposit area 825 of multi-compartment waste bin 811, to waste container or waste compartment 813 multi-compartment waste bin 811 when the item is determined to be a waste item 819 from processor analysis of the sensor data. For instance, the movable lid or flap may open one compartment and close another within multi-compartment waste bin 811, and/or allow gravity to move waste item 819 into waste compartment 815 once waste item 819 is placed or dropped into multi-compartment waste bin 811.

Multi-compartment waste bin system 800 may be configured with a movable lid or flap, and processor 803 may be further programmed to: move the movable lid or flap so as to direct the recyclable item 821, once placed within deposit area 825 of multi-compartment waste bin 811, to recyclable container or recyclable compartment 815 within multi-compartment waste bin 811 when the item is determined to be a recyclable item 821 from processor analysis of the sensor data. For instance, the movable lid or flap may open one compartment and close another within multi-compartment waste bin 811, and/or allow gravity to move the recyclable item into recyclable compartment 815 once the recyclable item is placed or dropped into the multi-compartment waste bin 811.

Processor 803 and/or associated transceiver may be further programmed to: receive location data from multi-compartment waste bin system 800; and/or transmit or relay the location data to client device 817 associated with at least one use.

Processor 803 may be further programmed to store, in memory device 823, location data and user data received from the one or more client devices 817 of the at least one user. Processor 803 and/or associated transceiver may be further programmed to: generate one or more notifications including at least one of recycling practices, bin locations, recycling days alerts, non-recycling days alerts, and bulletins addressing recycling; and/or transmit the one or more notifications to client devices 817 and one or more electronic signs.

Processor 803 and/or associated transceiver may be further programmed to: receive, from sensor 807, a location of one or more multi-compartment waste bins systems 800, where the one or more multi-compartment waste bins 811 include at least one internal recyclable bin and one internal non-recyclable bin; generate, using the received location, one or more maps including the one or more multi-compartment waste bin systems 800; and/or transmit the one or more maps to client devices 817 for display on client devices 817.

Processor 803 and/or associated transceiver may be further programmed to: generate a route map using the generated one or more maps; prioritize the location of multi-compartment waste bin systems 800 in the route map, wherein the prioritization is performed based upon the level of waste of each multi-compartment waste bin 811; and/or transmit the route map to one or more waste collection providers.

FIG. 7 illustrates an exemplary configuration of a computer-implemented method 700 for enhancing waste disposal, and directing waste and recyclables to corresponding compartments within multi-compartment waste bin system 800. Method 700 may be implemented via at least one local or remote processor and/or associated transceiver in communication with at least one memory device and at least one sensor, as shown in FIG. 8. Method 700 may include, via the at least one local or remote processor (e.g., processor 803, shown in FIG. 8) and/or associated transceiver: (1) receiving 705 sensor data associated with an item from at least one sensor, wherein the sensor data is gathered or generated by the at least one sensor located proximate to a multi-compartment waste bin; (2) analyzing 710 the sensor data to determine whether the item is waste or a recyclable item, such as by using a supervised or unsupervised machine learning model, algorithm, module, or program, or other machine learning techniques discussed elsewhere herein; (3) if 715 the item is determined to be a waste item from analysis of the sensor data, directing the waste item, once placed within the multi-compartment waste bin, to a waste container or waste compartment within the multi-compartment waste bin; and/or (4) alternatively, if 720 the item is determined to be a recyclable item from analysis of the sensor data, directing the recyclable item, once placed within the multi-compartment waste bin, to a recyclable container or recyclable compartment within the multi-compartment waste bin to facilitate separation of waste and recyclables into dedicated waste containers and recyclable containers, and the collection of recyclable items. Method 700 may include additional, less, or alternate actions, including those discussed elsewhere herein.

For instance, method 700 may include, via the at least one local or remote processor and/or associated transceiver: (a) determining, based upon the level of waste, whether collection of waste in the waste container or waste compartment within the multi-compartment waste bin is required (such as if the level of waste has reached a predetermined threshold or level); (b) in response to determining that collection of waste in the waste container and/or waste compartment within the multi-compartment waste bin is required, generating an alert including information corresponding to the multi-compartment waste bin; and/or (c) transmitting the alert, via wireless communication or data transmission, to one or more client devices associated with at least one user to notify the at least one user that the collection of waste in the waste container or waste compartment within the multi-compartment waste bin is required.

Method 700 may include, via the at least one local or remote processor and/or associated transceiver: (a) determining, based upon the level of recyclables, whether collection of recyclables in the recyclable container or recyclable compartment within the multi-compartment waste bin is required (such as if the level of recyclables has reached a predetermined threshold or level); (b) in response to determining that collection of recyclables in the recyclables container and/or recyclables compartment within the multi-compartment waste bin is required, generating an alert including information corresponding to the multi-compartment waste bin; and/or (c) transmitting the alert, via wireless communication or data transmission, to one or more client devices associated with at least one user to notify the at least one user that the collection of recyclables in the recyclables container or recyclables compartment within the multi-compartment waste bin is required.

The sensor may be a digital camera, and the sensor data may include digital image data. Method 700 may include via the at least one local or remote processor and/or associated transceiver: analyzing the sensor data to determine whether the item associated with the sensor data is plastic, aluminum, glass, or cardboard, such as by inputting the sensor data into a machine learning algorithm, module, or model.

The multi-compartment waste bin may be configured with a movable lid or flap, and the method 700 may include, via the at least one local or remote processor and/or associated transceiver: moving the movable lid or flap, or directing the movable lid or flap to a position, so as to direct the waste item, once placed within the multi-compartment waste bin, to a waste container or waste compartment within the multi-compartment waste bin when the item is determined to be a waste item from processor analysis of the sensor data.

The multi-compartment waste bin may be configured with a movable lid or flap, and method 700 may include, via the at least one local or remote processor and/or associated transceiver: moving the movable lid or flap, or directing the movable lid or flap to a position, so as to direct the recyclable item, once placed within the multi-compartment waste bin, to a recyclable container or recyclable compartment within the multi-compartment waste bin when the item is determined to be a recyclable item from processor analysis of the sensor data.

Method 700 may include, via the at least one local or remote processor and/or associated transceiver: receiving location data from the multi-compartment waste bin; and/or transmitting or relaying the location data to a client device associated with at least one use.

The at least one processor may be further programmed to store, in the at least one memory device, location data and user data received from the one or more client devices of the at least one user.

Method 700 may include, via the at least one local or remote processor and/or associated transceiver: generating one or more notifications including at least one of recycling practices, bin locations, recycling days alerts, non-recycling days alerts, and bulletins addressing recycling; and/or transmitting the one or more notifications to at least one of the one or more client devices and one or more electronic signs.

Method 700 may include, via the at least one local or remote processor and/or associated transceiver: receiving, from the at least one sensor, a location of one or more multi-compartment waste bins, where the one or more multi-compartment waste bins include at least one internal recyclable bin and one internal non-recyclable bin; generating, using the received location, one or more maps including the one or more multi-compartment waste bins; and/or transmitting the one or more maps to the one or more client devices for display on the one or more client devices.

Method 700 may include, via the at least one local or remote processor and/or associated transceiver: generating a route map using the generated one or more maps; prioritizing the location of the one or more multi-compartment waste bins in the route map, wherein the prioritization is performed based upon the level of waste of each multi-compartment waste bin; and/or transmitting the route map to one or more waste collection providers.

Exemplary Embodiments

In one aspect, a computer system including sensor and alternative power technologies for enhancing waste disposal and energy efficiency may be provided. The computer system may include at least one computing device including at least one processor and/or associated transceiver in communication with at least one memory device. The at least one processor and/or associated transceiver may be programmed to: (i) receive waste data and recycling data from at least one sensor, wherein the waste data and the recycling data are gathered by the at least one sensor located proximate to a waste bin, (ii) determine a level of waste in the waste bin based upon the received waste data, and a level of contamination of the waste bin based upon the received recycling data, (iii) determine, based upon the level of waste, whether collection of waste in the waste bin is required, (iv) determine, based upon the level of contamination, whether decontamination of the waste bin is required, (v) in response to determining that one of collection of waste in the waste bin is required and decontamination of the waste bin is required, generate an alert including information corresponding to the waste bin, and (vi) transmit the alert, via wireless communication or data transmission, to one or more client devices associated with at least one user to notify the at least one user that the collection of waste in the waste bin is required or the decontamination of the waste bin is required. The computer system may include additional, less, or alternate functionality, including that discussed elsewhere herein.

In some embodiments, the at least one processor may be further programmed to receive user data from a client device associated with the at least one user, and identify, using the user data, the at least one user as a user of the waste bin.

In some embodiments, the at least one processor may be further programmed to receive location data from a client device associated with the at least one user, and infer, using the location data, the location of the waste bin, wherein the waste bin is located proximate to the client device, In some embodiments, the at least one processor may be further programmed to store, in the at least one memory device, location data and user data received from the one or more client devices of the at least one user.

In some embodiments, at least one processor may be further programmed to generate a waste tutorial (WT) computer application, wherein the WT computer application provides instructions to the at least one user on how to recycle waste, and transmit the WT computer application to the one or more client devices for use on the one or more client devices.

In some embodiments, the at least one processor may be further programmed to receive, via the WT computer application, input from the at least one user, wherein the input includes at least one of a picture of an item to be disposed on the waste bin and a description of the item, analyze the input to determine a type of waste of the item, wherein the type of waste includes one of a recyclable item and a non-recyclable item, in response to determining the type of waste of the item, transmit, in real-time via the WT computer application to the one or more client devices, waste disposal instructions for the item, wherein the waste disposal instructions include one of disposing of the item in a recycle bin and disposing of the item in a non-recycle bin, and cause the WT computer application to display the waste disposal instructions on the one or more client devices.

In some embodiments, the at least one processor may be further programmed to generate one or more notifications including at least one of recycling practices, bin locations, recycling days alerts, non-recycling days alerts, and bulletins addressing recycling, and transmit the one or more notifications to at least one of the one or more client devices and one or more electronic signs.

In some embodiments, the at least one processor may be further programmed to receive, from the at least one sensor, a location of one or more waste bins, where the one or more waste bins include at least one a recyclable bin and a non-recyclable bin, generate, using the received location, one or more maps including the one or more waste bins, and transmit the one or more maps to the one or more client devices for display on the one or more client devices.

In some embodiments, the at least one processor may be further programmed to generate a route map using the generated one or more maps, prioritize the location of the one or more waste bins in the route map, wherein the prioritization is performed based upon the level of waste of each waste bin of the one or more waste bins and the level of contamination of each waste bin of the one or more waste bins, and transmit the route map to one or more waste collection providers.

In some embodiments, the at least one processor may be further programmed to identify, using the received waste data and the received recycling data, patterns of the at least one user, build waste disposal models based upon the identified patterns of the at least one user, generate one or more notifications including at least one indications of items that have been incorrectly recycled, ways to correctly recycle the items, and a link to a reward/point program that encourages the at least one user to correctly recycle the item, and transmit the one or more notifications to the one or more client devices.

In another aspect, a computer-implemented method for enhancing waste disposal and energy efficiency using a computer system including sensor and alternative power technologies may be provided. The computer system may include at least one computing device including at least one processor and/or associated transceiver in communication with at least one memory device. The method may include, via the at least one processor and/or associated transceiver: (i) receiving waste data and recycling data from at least one sensor, wherein the waste data and the recycling data are gathered by the at least one sensor located proximate to a waste bin, (ii) determining a level of waste in the waste bin based upon the received waste data, and a level of contamination of the waste bin based upon the received recycling data, (iii) determining, based upon the level of waste, whether collection of waste in the waste bin is required, (iv) determining, based upon the level of contamination, whether decontamination of the waste bin is required, (v) in response to determining that one of collection of waste in the waste bin is required and decontamination of the waste bin is required, generating an alert including information corresponding to the waste bin, and (vi) transmitting the alert, via wireless communication or data transmission, to one or more client devices associated with at least one user to notify the at least one user that the collection of waste in the waste bin is required or the decontamination of the waste bin is required. The method may include additional, less, or alternate actions, including those discussed elsewhere herein.

In some embodiments, the computer-implemented method may further include receiving user data from a client device associated with the at least one user, and identifying, using the user data, the at least one user as a user of the waste bin.

In some embodiments, the computer-implemented method may further include receiving location data from a client device associated with the at least one user, and inferring, using the location data, the location of the waste bin, wherein the waste bin is located proximate to the client device.

In some embodiments, the method further includes storing, in the at least one memory device, location data and user data received from the one or more client devices of the at least one user.

In some embodiments, the computer-implemented method may further include generating a waste tutorial (WT) computer application, wherein the WT computer application provides instructions to the at least one user on how to recycle waste, and transmitting the WT computer application to the one or more client devices for use on the one or more client devices.

In some embodiments, the computer-implemented method may further include receiving, via the WT computer application, input from the at least one user, wherein the input includes at least one of a picture of an item to be disposed on the waste bin and a description of the item, analyzing the input to determine a type of waste of the item, wherein the type of waste includes one of a recyclable item and a non-recyclable item, in response to determining the type of waste of the item, transmitting, in real-time via the WT computer application to the one or more client devices, waste disposal instructions for the item, wherein the waste disposal instructions include one of disposing of the item in a recycle bin and disposing of the item in a non-recycle bin, and causing the WT computer application to display the waste disposal instructions on the one or more client devices.

In some embodiments, the computer-implemented method may further include generating one or more notifications including at least one of recycling practices, bin locations, recycling days alerts, non-recycling days alerts, and bulletins addressing recycling, and transmitting the one or more notifications to at least one of the one or more client devices and one or more electronic signs.

In some embodiments, the computer-implemented method may further include receiving, from the at least one sensor, a location of one or more waste bins, where the one or more waste bins include at least one a recyclable bin and a non-recyclable bin, generating, using the received location, one or more maps including the one or more waste bins, and transmitting the one or more maps to the one or more client devices for display on the one or more client devices.

In some embodiments, the computer-implemented method may further include generating a route map using the generated one or more maps, prioritizing the location of the one or more waste bins in the route map, wherein the prioritization is performed based upon the level of waste of each waste bin of the one or more waste bins and the level of contamination of each waste bin of the one or more waste bins, and transmitting the route map to one or more waste collection providers.

In some embodiments, the computer-implemented method may further include identifying, using the received waste data and the received recycling data, patterns of the at least one user, building waste disposal models based upon the identified patterns of the at least one user, generating one or more notifications including at least one indications of items that have been incorrectly recycled, ways to correctly recycle the items, and a link to a reward/point program that encourages the at least one user to correctly recycle the item, and transmitting the one or more notifications to the one or more client devices.

In yet another aspect, at least one non-transitory computer-readable media having computer-executable instructions thereon may be provided. The computer-executable instructions when executed by at least one processor (and/or associated transceiver) of a computing device for enhancing waste disposal and energy efficiency causes the at least one processor (and/or associated transceiver) to: (i) receive waste data and recycling data from at least one sensor, wherein the waste data and the recycling data are gathered by the at least one sensor located proximate to a waste bin, (ii) determine a level of waste in the waste bin based upon the received waste data, and a level of contamination of the waste bin based upon the received recycling data, (iii) determine, based upon the level of waste, whether collection of waste in the waste bin is required, (iv) determine, based upon the level of contamination, whether decontamination of the waste bin is required, (v) in response to determining that one of collection of waste in the waste bin is required and decontamination of the waste bin is required, generate an alert including information corresponding to the waste bin, and (vi) transmit the alert, via wireless communication or data transmission, to one or more client devices associated with at least one user to notify the at least one user that the collection of waste in the waste bin is required or the decontamination of the waste bin is required. The instructions may direct additional, less, or alternate functionality, including that discussed elsewhere herein.

In some embodiments, the computer-executable instructions may further cause the at least one processor to receive user data from a client device associated with the at least one user, and identify, using the user data, the at least one user as a user of the waste bin.

In some embodiments, the computer-executable instructions may further cause the at least one processor to receive location data from a client device associated with the at least one user, and infer, using the location data, the location of the waste bin, wherein the waste bin is located proximate to the client device.

In some embodiments, the computer-executable instructions may further cause the at least one processor to store, in the at least one memory device, location data and user data received from the one or more client devices of the at least one user.

In some embodiments, the computer-executable instructions may further cause the at least one processor to generate a waste tutorial (WT) computer application, wherein the WT computer application provides instructions to the at least one user on how to recycle waste, and transmit the WT computer application to the one or more client devices for use on the one or more client devices.

In some embodiments, the computer-executable instructions may further cause the at least one processor to receive, via the WT computer application, input from the at least one user, wherein the input includes at least one of a picture of an item to be disposed on the waste bin and a description of the item, analyze the input to determine a type of waste of the item, wherein the type of waste includes one of a recyclable item and a non-recyclable item, in response to determining the type of waste of the item, transmit, in real-time via the WT computer application to the one or more client devices, waste disposal instructions for the item, wherein the waste disposal instructions include one of disposing of the item in a recycle bin and disposing of the item in a non-recycle bin, and cause the WT computer application to display the waste disposal instructions on the one or more client devices.

In some embodiments, the computer-executable instructions may further cause the at least one processor to generate one or more notifications including at least one of recycling practices, bin locations, recycling days alerts, non-recycling days alerts, and bulletins addressing recycling, and transmit the one or more notifications to at least one of the one or more client devices and one or more electronic signs.

In some embodiments, the computer-executable instructions may further cause the at least one processor to receive, from the at least one sensor, a location of one or more waste bins, where the one or more waste bins include at least one a recyclable bin and a non-recyclable bin, generate, using the received location, one or more maps including the one or more waste bins, and transmit the one or more maps to the one or more client devices for display on the one or more client devices.

In some embodiments, the computer-executable instructions may further cause the at least one processor to generate a route map using the generated one or more maps, prioritize the location of the one or more waste bins in the route map, wherein the prioritization is performed based upon the level of waste of each waste bin of the one or more waste bins and the level of contamination of each waste bin of the one or more waste bins, and transmit the route map to one or more waste collection providers.

In some embodiments, the computer-executable instructions further may cause the at least one processor to identify, using the received waste data and the received recycling data, patterns of the at least one user, build waste disposal models based upon the identified patterns of the at least one user, generate one or more notifications including at least one indications of items that have been incorrectly recycled, ways to correctly recycle the items, and a link to a reward/point program that encourages the at least one user to correctly recycle the item, and transmit the one or more notifications to the one or more client devices.

In one aspect, a computer system including sensor and alternative power technologies for enhancing energy efficiency, and alerting users in real-time of energy levels corresponding to one or more electric devices may be provided. The computer system may include at least one computing device including at least one processor and/or associated transceiver in communication with at least one memory device. The at least one processor and/or associated transceiver may be programmed to: (i) collect, via at least one sensor, energy data from the one or more electric devices associated with a user, (ii) build, using the collected energy data, a risk profile for the user, wherein the risk profile includes energy consumption patterns of the one or more electric devices, (iii) receive insurance data from one or more insurance servers, wherein the insurance data includes one or more insurance plans, (iv) compare the risk profile to the one or more insurance plans, (v) determine, based upon the comparison, an insurance plan of the one or more insurance plans, wherein the insurance plan includes information matching most of the energy consumption patterns in comparison to other insurance plans of the one or more insurance plans, and (iv) transmit the insurance plan to one or more client devices associated with the user. The computer system may include additional, less, or alternate functionality, including that discussed elsewhere herein.

In some embodiments, the at least one processor may be further programmed to determine whether the user is qualified to receive an insurance discount based upon the energy consumption patterns.

In some embodiments, the at least one processor may be further programmed to determine a monthly insurance rate for the user based upon the energy consumption patterns.

In some embodiments, the at least one processor may be further programmed to modify the insurance data to include the determined insurance plan, an insurance discount, and a monthly insurance rate, and transmit the modified insurance data to at least one of the one or more client devices and the one or more insurance servers.

In some embodiments, the at least one processor may be further programmed to generate, based upon the risk profile, alerts including at least one of driving recommendations and alternative driving routes, and transmit the alerts to the one or more client devices.

In some embodiments, the at least one processor may be further programmed to determine, using information from location data received from the one or more client devices, common routes traveled by the user, and generate the driving recommendations based upon the determined common routes.

In some embodiments, the at least one processor may be further programmed to compare the collected energy data to one or more predefined thresholds, generate an alert based upon the comparison, and transmit the alert to the one or more client devices.

In some embodiments, the at least one processor may be further programmed to generate, using location identifier included in the collected energy data, a map including one or more electric charging stations, generate a list of recommended electric charging stations sorted by energy prices and charging times of each charging station, generate a station alert including at least one of the generated map and the list of recommended charging stations, and transmit the station alert to the one or more client devices.

In some embodiments, the at least one processor may be further programmed to generate an electric charging (EC) computer application, wherein the EC computer application enables the one or more client devices to communicate with one or more electric charging stations, via wireless communication, receive, via the EC computing application, energy charging information corresponding to energy loaded into the one or more electric devices, analyze the received energy information to identify one or more energy usage patterns associated with the one or more electric devices, build, based upon the one or more energy usage patterns, one or more energy usage models associated with the one or more electric devices, and transmit the one or more usage patterns to at least one of the one or more client devices and the one or more insurance servers.

In some embodiments, the at least one processor may be further programmed to collect, via one or more smart energy meters, the energy data, analyze the received energy data to identify one or more energy usage patterns associated with the one or more electric devices, build, based upon the one or more energy usage patterns, one or more energy usage models associated with the one or more electric devices, and transmit the one or more usage patterns to a one or more energy computing devices associated with one or more electricity suppliers.

In another aspect, a computer-implemented method for enhancing energy efficiency, and alerting users in real-time of energy levels corresponding to one or more electric devices may be provided. The computer system may include at least one computing device including at least one processor and/or associated transceiver in communication with at least one memory device. The method may include, via the at least one processor and/or associated transceiver: (i) collecting, via at least one sensor, energy data from the one or more electric devices associated with a user, (ii) building, using the collected energy data, a risk profile for the user, wherein the risk profile includes energy consumption patterns of the one or more electric devices, (iii) receiving insurance data from one or more insurance servers, wherein the insurance data includes one or more insurance plans, (iv) comparing the risk profile to the one or more insurance plans, (v) determining, based upon the comparison, an insurance plan of the one or more insurance plans, wherein the insurance plan includes information matching most of the energy consumption patterns in comparison to other insurance plans of the one or more insurance plans, and (vi) transmitting the insurance plan to one or more client devices associated with the user. The method may include additional, less, or alternate actions, including those discussed elsewhere herein.

In some embodiments, the computer-implemented method may further include determining whether the user is qualified to receive an insurance discount based upon the energy consumption patterns.

In some embodiments, the computer-implemented method may further include determining a monthly insurance rate for the user based upon the energy consumption patterns.

In some embodiments, the computer-implemented method may further include modifying the insurance data to include the determined insurance plan, an insurance discount, and a monthly insurance rate, and transmitting the modified insurance data to at least one of the one or more client devices and the one or more insurance servers.

In some embodiments, the computer-implemented method may further include generating, based upon the risk profile, alerts including at least one of driving recommendations and alternative driving routes, and transmitting the alerts to the one or more client devices.

In some embodiments, the computer-implemented method may further include determining, using information from location data received from the one or more client devices, common routes traveled by the user, and generating the driving recommendations based upon the determined common routes.

In some embodiments, the computer-implemented method may further include comparing the collected energy data to one or more predefined thresholds, generating an alert based upon the comparison, and transmitting the alert to the one or more client devices.

In some embodiments, the computer-implemented method may further include generating, using location identifier included in the collected energy data, a map including one or more electric charging stations, generating a list of recommended electric charging stations sorted by energy prices and charging times of each charging station, generating a station alert including at least one of the generated map and the list of recommended charging stations, and transmitting the station alert to the one or more client devices.

In some embodiments, the computer-implemented method may further include generating an electric charging (EC) computer application, wherein the EC computer application enables the one or more client devices to communicate with one or more electric charging stations, via wireless communication, receiving, via the EC computing application, energy charging information corresponding to energy loaded into the one or more electric devices, analyzing the received energy information to identify one or more energy usage patterns associated with the one or more electric devices, building, based upon the one or more energy usage patterns, one or more energy usage models associated with the one or more electric devices, and transmitting the one or more usage patterns to at least one of the one or more client devices and the one or more insurance servers.

In some embodiments, the computer-implemented method may further include collecting, via one or more smart energy meters, the energy data analyzing the received energy data to identify one or more energy usage patterns associated with the one or more electric devices, building, based upon the one or more energy usage patterns, one or more energy usage models associated with the one or more electric devices, and transmitting the one or more usage patterns to a one or more energy computing devices associated with one or more electricity suppliers.

In yet another aspect, at least one non-transitory computer-readable media having computer-executable instructions thereon may be provided. The computer-executable instructions when executed by at least one processor (and/or associated transceiver) of a computing device for enhancing energy efficiency causes the at least one processor (and/or associated transceiver) to: (i) collect, via at least one sensor, energy data from the one or more electric devices associated with a user, (ii) build, using the collected energy data, a risk profile for the user, wherein the risk profile includes energy consumption patterns of the one or more electric devices, (iii) receive insurance data from one or more insurance servers, wherein the insurance data includes one or more insurance plans, (iv) compare the risk profile to the one or more insurance plans, (v) determine, based upon the comparison, an insurance plan of the one or more insurance plans, wherein the insurance plan includes information matching most of the energy consumption patterns in comparison to other insurance plans of the one or more insurance plans, and (iv) transmit the insurance plan to one or more client devices associated with the user. The instructions may direct additional, less, or alternate functionality, including that discussed elsewhere herein.

In some embodiments, the computer-executable instructions may further cause the at least one processor to determine whether the user is qualified to receive an insurance discount based upon the energy consumption patterns.

In some embodiments, the computer-executable instructions further may cause the at least one processor to determine a monthly insurance rate for the user based upon the energy consumption patterns.

In some embodiments, the computer-executable instructions may further cause the at least one processor to modify the insurance data to include the determined insurance plan, an insurance discount, and a monthly insurance rate, and transmit the modified insurance data to at least one of the one or more client devices and the one or more insurance servers.

In some embodiments, the computer-executable instructions may further cause the at least one processor to generate, based upon the risk profile, alerts including at least one of driving recommendations and alternative driving routes, and transmit the alerts to the one or more client devices.

In some embodiments, the computer-executable instructions may further cause the at least one processor to determine, using information from location data received from the one or more client devices, common routes traveled by the user, and generate the driving recommendations based upon the determined common routes.

In some embodiments, the computer-executable instructions may further cause the at least one processor to compare the collected energy data to one or more predefined thresholds, generate an alert based upon the comparison, and transmit the alert to the one or more client devices.

In some embodiments, the computer-executable instructions may further cause the at least one processor to generate, using location identifier included in the collected energy data, a map including one or more electric charging stations, generate a list of recommended electric charging stations sorted by energy prices and charging times of each charging station, generate a station alert including at least one of the generated map and the list of recommended charging stations, and transmit the station alert to the one or more client devices.

In some embodiments, the computer-executable instructions may further cause the at least one processor to generate an electric charging (EC) computer application, wherein the EC computer application enables the one or more client devices to communicate with one or more electric charging stations, via wireless communication, receive, via the EC computing application, energy charging information corresponding to energy loaded into the one or more electric devices, analyze the received energy information to identify one or more energy usage patterns associated with the one or more electric devices, build, based upon the one or more energy usage patterns, one or more energy usage models associated with the one or more electric devices, and transmit the one or more usage patterns to at least one of the one or more client devices and the one or more insurance servers.

In some embodiments, the computer-executable instructions may further cause the at least one processor to collect, via one or more smart energy meters, the energy data analyze the received energy data to identify one or more energy usage patterns associated with the one or more electric devices, build, based upon the one or more energy usage patterns, one or more energy usage models associated with the one or more electric devices, and transmit the one or more usage patterns to a one or more energy computing devices associated with one or more electricity suppliers.

In one aspect, a computer system including sensor and alternative power technologies for enhancing waste disposal and energy efficiency may be provided. The computer system may include at least one computing device including at least one processor and/or associated transceiver in communication with at least one memory device. The at least one processor and/or associated transceiver may be programmed to: (i) receive sensor data associated with an item from at least one sensor, wherein the sensor data is gathered or generated by the at least one sensor located proximate to a multi-compartment waste bin; (ii) analyze the sensor data to determine whether the item is waste or a recyclable item (such as by using machine learning techniques discussed herein); (iii) if the item is determined to be a waste item from analysis of the sensor data, direct the waste item, once placed within the multi-compartment waste bin, to a waste container or waste compartment within the multi-compartment waste bin; and (iv) alternatively, if the item is determined to be a recyclable item from analysis of the sensor data, direct the recyclable item, once placed within the multi-compartment waste bin, to a recyclable container or recyclable compartment within the multi-compartment waste bin to facilitate separation of waste and recyclables into dedicated waste containers and recyclable containers, and the collection of recyclable items. The computer system may include additional, less, or alternate functionality, including that discussed elsewhere herein.

In some embodiments, the at least one processor and/or associated transceiver may be further programmed to determine, based upon the level of waste, whether collection of waste in the waste container or waste compartment within the multi-compartment waste bin is required (such as if the level of waste has reached a predetermined threshold or level), in response to determining that one of collection of waste in the waste container or waste compartment within the multi-compartment waste bin is required, generate an alert including information corresponding to the multi-compartment waste bin; and transmit the alert, via wireless communication or data transmission, to one or more client devices associated with at least one user to notify the at least one user that the collection of waste in the waste container or waste compartment within the multi-compartment waste bin is required.

In some embodiments, the at least one processor and/or associated transceiver may be further programmed to determine, based upon the level of recyclables, whether collection of recyclables in the recyclable container or recyclable compartment within the multi-compartment waste bin is required (such as if the level of recyclables has reached a predetermined threshold or level), in response to determining that one of collection of recyclables in the recyclables container or recyclables compartment within the multi-compartment waste bin is required, generate an alert including information corresponding to the multi-compartment waste bin, and transmit the alert, via wireless communication or data transmission, to one or more client devices associated with at least one user to notify the at least one user that the collection of recyclables in the recyclables container or recyclables compartment within the multi-compartment waste bin is required.

In some embodiments, the at least one sensor is a digital camera, and the sensor data may include digital image data.

In some embodiments, the at least one processor may be further programmed to analyze the sensor data to determine whether the item associated with the sensor data is plastic, aluminum, glass, or cardboard (such as by using machine learning techniques discussed herein In some embodiments, the multi-compartment waste bin may be configured with a movable lid or flap, and the at least one processor is further programmed to move the movable lid or flap so as to direct the waste item, once placed within the multi-compartment waste bin, to a waste container or waste compartment within the multi-compartment waste bin when the item is determined to be a waste item from processor analysis of the sensor.

In some embodiments, the movable lid or flap may open one compartment and close another within the multi-compartment waste bin, and/or allow gravity to move the waste item into a waste compartment within the multi-compartment waste bin once the waste item is placed or dropped into the multi-compartment waste bin.

In some embodiments, the multi-compartment waste bin may be configured with a movable lid or flap, and the at least one processor is further programmed to move the movable lid or flap so as to direct the recyclable item, once placed within the multi-compartment waste bin, to a recyclable container or recyclable compartment within the multi-compartment waste bin when the item is determined to be a recyclable item from processor analysis of the sensor data.

In some embodiments, the movable lid or flap may open one compartment and close another within the multi-compartment waste bin, and/or allow gravity to move the recyclable item into a recyclable compartment within the multi-compartment waste bin once the recyclable item is placed or dropped into the multi-compartment waste bin.

In some embodiments, the at least one processor and/or associated transceiver may be further programmed to receive location data from the multi-compartment waste bin, and transmit or relay the location data to a client device associated with at least one use.

In some embodiments, the at least one processor may be further programmed to store, in the at least one memory device, location data and user data received from the one or more client devices of the at least one user.

In some embodiments, the at least one processor and/or associated transceiver may be further programmed to generate one or more notifications including at least one of recycling practices, bin locations, recycling days alerts, non-recycling days alerts, and bulletins addressing recycling, and transmit the one or more notifications to at least one of the one or more client devices and one or more electronic signs.

In some embodiments, the at least one processor and/or associated transceiver may be further programmed to receive, from the at least one sensor, a location of one or more multi-compartment waste bins, where the one or more multi-compartment waste bins include at least one internal recyclable bin and one internal non-recyclable bin, generate, using the received location, one or more maps including the one or more multi-compartment waste bins, and transmit the one or more maps to the one or more client devices for display on the one or more client devices.

In some embodiments, the at least one processor and/or associated transceiver may be further programmed to generate a route map using the generated one or more maps, prioritize the location of the one or more multi-compartment waste bins in the route map, wherein the prioritization is performed based upon the level of waste of each multi-compartment waste bin, transmit the route map to one or more waste collection providers.

In another aspect, a computer-implemented method for enhancing energy efficiency, and alerting users in real-time of energy levels corresponding to one or more electric devices may be provided. The computer system may include at least one computing device including at least one processor and/or associated transceiver in communication with at least one memory device. The method may include, via the at least one processor and/or associated transceiver: (i) receiving sensor data associated with an item from at least one sensor, wherein the sensor data is gathered or generated by the at least one sensor located proximate to a multi-compartment waste bin; (ii) analyzing the sensor data to determine whether the item is waste or a recyclable item (such as by using machine learning techniques discussed herein); (iii) if the item is determined to be a waste item from analysis of the sensor data, directing the waste item, once placed within the multi-compartment waste bin, to a waste container or waste compartment within the multi-compartment waste bin; and (iv) alternatively, if the item is determined to be a recyclable item from analysis of the sensor data, directing the recyclable item, once placed within the multi-compartment waste bin, to a recyclable container or recyclable compartment within the multi-compartment waste bin to facilitate separation of waste and recyclables into dedicated waste containers and recyclable containers, and the collection of recyclable items. The method may include additional, less, or alternate actions, including those discussed elsewhere herein.

In some embodiments, the computer-implemented method may further include, via the at least one local or remote processor and/or associated transceiver, determining, based upon the level of waste, whether collection of waste in the waste container or waste compartment within the multi-compartment waste bin is required (such as if the level of waste has reached a predetermined threshold or level), in response to determining that one of collection of waste in the waste container or waste compartment within the multi-compartment waste bin is required, generating an alert including information corresponding to the multi-compartment waste bin, and transmitting the alert, via wireless communication or data transmission, to one or more client devices associated with at least one user to notify the at least one user that the collection of waste in the waste container or waste compartment within the multi-compartment waste bin is required.

In some embodiments, the computer-implemented method may further include, via the at least one local or remote processor and/or associated transceiver, determining, based upon the level of recyclables, whether collection of recyclables in the recyclable container or recyclable compartment within the multi-compartment waste bin is required (such as if the level of recyclables has reached a predetermined threshold or level), in response to determining that one of collection of recyclables in the recyclables container or recyclables compartment within the multi-compartment waste bin is required, generating an alert including information corresponding to the multi-compartment waste bin, and transmitting the alert, via wireless communication or data transmission, to one or more client devices associated with at least one user to notify the at least one user that the collection of recyclables in the recyclables container or recyclables compartment within the multi-compartment waste bin is required.

In some embodiments, the at least one sensor is a digital camera, and the sensor data may include digital image data.

In some embodiments, the computer-implemented method may further include, via the at least one local or remote processor and/or associated transceiver, analyzing the sensor data to determine whether the item associated with the sensor data is plastic, aluminum, glass, or cardboard.

In some embodiments, the multi-compartment waste bin may be configured with a movable lid or flap, and the method further includes, via the at least one locate or remote processor and/or associated transceiver, moving the movable lid or flap, or directing the movable lid or flap to position, so as to direct the waste item, once placed within the multi-compartment waste bin, to a waste container or waste compartment within the multi-compartment waste bin when the item is determined to be a waste item from processor analysis of the sensor data.

In some embodiments the multi-compartment waste bin may be configured with a movable lid or flap, and the method further includes, via the at least one local or remote processor and/or associated transceiver, moving the movable lid or flap, or directing the movable lid or flap to a position, so as to direct the recyclable item, once placed within the multi-compartment waste bin, to a recyclable container or recyclable compartment within the multi-compartment waste bin when the item is determined to be a recyclable item from processor analysis of the sensor data.

In some embodiments, the computer-implemented method may further include, via the at least one local or remote processor and/or associated transceiver, receiving location data from the multi-compartment waste bin, and transmitting or relaying the location data to a client device associated with at least one use.

In some embodiments, the computer-implemented method may further include storing, in the at least one memory device, location data and user data received from the one or more client devices of the at least one user.

In some embodiments, the computer-implemented method may further include, via the at least one local or remote processor and/or associated transceiver, generating one or more notifications including at least one of recycling practices, bin locations, recycling days alerts, non-recycling days alerts, and bulletins addressing recycling, and transmitting the one or more notifications to at least one of the one or more client devices and one or more electronic signs.

In some embodiments, the computer-implemented method may further include, via the at least one local or remote processor and/or associated transceiver, receiving, from the at least one sensor, a location of one or more multi-compartment waste bins, where the one or more multi-compartment waste bins include at least one internal recyclable bin and one internal non-recyclable bin, generating, using the received location, one or more maps including the one or more multi-compartment waste bins, and transmitting the one or more maps to the one or more client devices for display on the one or more client devices.

In some embodiments, the computer-implemented method may further include, via the at least one local or remote processor and/or associated transceiver, generating a route map using the generated one or more maps, prioritizing the location of the one or more multi-compartment waste bins in the route map, wherein the prioritization is performed based upon the level of waste of each multi-compartment waste bin, and transmitting the route map to one or more waste collection providers.

In one aspect, a computer system including sensor and alternative power technologies for enhancing waste disposal and energy efficiency may be provided. The computer system may include at least one computing device including at least one processor and/or associated transceiver in communication with at least one memory device. The at least one processor and/or associated transceiver may be programmed to: (i) receive sensor data associated with an item from at least one sensor, wherein the sensor data is generated by the at least one sensor located proximate to a multi-compartment waste bin; (ii) utilize machine learning techniques to analyze the sensor data to determine whether the item is a waste item or a recyclable item; (iii) if the item is determined to be a waste item from analysis of the sensor data, automatically direct the waste item, once placed within the multi-compartment waste bin, to a waste compartment within the multi-compartment waste bin; and (iv) if the item is determined to be a recyclable item from analysis of the sensor data, automatically direct the recyclable item, once placed within the multi-compartment waste bin, to a recyclable compartment within the multi-compartment waste bin to facilitate separation of waste and recyclables into dedicated waste compartments and recyclable compartments, and the collection of recyclable items. The computer system may include additional, less, or alternate functionality, including that discussed elsewhere herein.

In some embodiments, the at least one processor and/or associated transceiver may be further programmed to determine, based upon a level of waste detected by a level sensor, whether collection of waste in the waste compartment within the multi-compartment waste bin is required, in response to determining that the collection of waste in the waste compartment within the multi-compartment waste bin is required, generate an alert including information corresponding to the multi-compartment waste bin for waste collection, and transmit the alert, via wireless communication, to one or more client devices associated with at least one user to notify the at least one user that the collection of waste in the waste compartment within the multi-compartment waste bin is required.

In some embodiments, the at least one processor and/or associated transceiver may be further programmed to determine, based upon a level of recyclables detected by a level sensor, whether collection of recyclables in the recyclable compartment within the multi-compartment waste bin is required, in response to determining that the collection of recyclables in the recyclables compartment within the multi-compartment waste bin is required, generate an alert including information corresponding to the multi-compartment waste bin for the collection of recyclables, and transmit the alert, via wireless communication, to one or more client devices associated with at least one user to notify the at least one user that the collection of recyclables in the recyclables compartment within the multi-compartment waste bin is required.

In some embodiments, the at least one sensor may be a digital camera, and the sensor data includes digital image data.

In some embodiments, the at least one processor and/or associated transceiver may be further programmed to utilize machine learning techniques to analyze the sensor data to determine whether the item associated with the sensor data is plastic, aluminum, glass, or cardboard.

In some embodiments, the multi-compartment waste bin may be configured with at least one of a movable lid and a flap, and the at least one processor and/or associated transceiver is further programmed to move the at least one of the movable lid or flap to direct the waste item, once placed within the multi-compartment waste bin, to the waste compartment within the multi-compartment waste bin when the item is determined to be a waste item from processor analysis of the sensor data.

In some embodiments, the at least one of the movable lid and the flap is configured to perform at least one of open one compartment and close another compartment within the multi-compartment waste bin, and allow gravity to move the waste item into the waste compartment within the multi-compartment waste bin once the waste item is placed or dropped into the multi-compartment waste bin.

In some embodiments, the multi-compartment waste bin may be configured with at least one of a movable lid and a flap, and the at least one processor and/or associated transceiver is further programmed to move the at least one of the movable lid and the flap to direct the recyclable item, once placed within the multi-compartment waste bin, to the recyclable compartment within the multi-compartment waste bin when the item is determined to be a recyclable item from processor analysis of the sensor data.

In some embodiments, the at least one movable lid and flap may be configured to perform at least one of open one compartment and close another within the multi-compartment waste bin, and allow gravity to move the recyclable item into the recyclable compartment within the multi-compartment waste bin once the recyclable item is placed or dropped into the multi-compartment waste bin.

In some embodiments, the at least one processor and/or associated transceiver may be further programmed to receive location data from the multi-compartment waste bin, and transmit the location data to a client device associated with at least one user.

In some embodiments, the at least one processor may be further programmed to store, in the at least one memory device, location data and user data received from one or more client devices of at least one user.

In some embodiments, the at least one processor and/or associated transceiver may be further programmed to generate one or more notifications including at least one of recycling practices, bin locations, recycling days alerts, non-recycling days alerts, and bulletins addressing recycling, and transmit the one or more notifications to at least one of client devices and electronic signs.

In some embodiments, the at least one processor and/or associated transceiver may be further programmed to receive, from the at least one sensor, a location of one or more multi-compartment waste bins, wherein the one or more multi-compartment waste bins include at least one internal recyclable bin and one internal waste bin, generate, using the received location, one or more maps including the one or more multi-compartment waste bins, and transmit the one or more maps to one or more client devices for display on the one or more client devices.

In some embodiments, the at least one processor and/or associated transceiver may be further programmed to generate a route map using the generated one or more maps, prioritize the location of the one or more multi-compartment waste bins in the route map, wherein the prioritization is performed based upon ae level of waste of each multi-compartment waste bin, and transmit the route map to one or more waste collection providers.

In another aspect, a computer-implemented method for enhancing energy efficiency, and alerting users in real-time of energy levels corresponding to one or more electric devices may be provided. The computer system may include at least one computing device including at least one processor and/or associated transceiver in communication with at least one memory device. The method may include, via the at least one processor and/or associated transceiver: (i) receiving sensor data associated with an item from at least one sensor, wherein the sensor data is generated by the at least one sensor located proximate to a multi-compartment waste bin; (ii) utilizing machine learning techniques to analyze the sensor data to determine whether the item is a waste item or a recyclable item; (iii) if the item is determined to be a waste item from analysis of the sensor data, automatically directing the waste item, once placed within the multi-compartment waste bin, to a waste compartment within the multi-compartment waste bin; and (iv) if the item is determined to be a recyclable item from analysis of the sensor data, automatically directing the recyclable item, once placed within the multi-compartment waste bin, to a recyclable compartment within the multi-compartment waste bin to facilitate separation of waste and recyclables into dedicated waste compartments and recyclable compartments, and the collection of recyclable items. The method may include additional, less, or alternate actions, including those discussed elsewhere herein.

In some embodiments, the computer-implemented method may further include determining, based upon a level of waste detected by a level sensor, whether collection of waste in the waste compartment within the multi-compartment waste bin is required, in response to determining that the collection of waste in the waste compartment within the multi-compartment waste bin is required, generating an alert including information corresponding to the multi-compartment waste bin for waste collection, and transmitting the alert, via wireless communication, to one or more client devices associated with at least one user to notify the at least one user that the collection of waste in the waste compartment within the multi-compartment waste bin is required.

In some embodiments, the computer-implemented method may further include determining, based upon a level of recyclables detected by a level sensor, whether collection of recyclables in the recyclable compartment within the multi-compartment waste bin is required, in response to determining that the collection of recyclables in the recyclables compartment within the multi-compartment waste bin is required, generating an alert including information corresponding to the multi-compartment waste bin for the collection of recyclables, and transmitting the alert, via wireless communication, to one or more client devices associated with at least one user to notify the at least one user that the collection of recyclables in the recyclables compartment within the multi-compartment waste bin is required.

In some embodiments, the at least one sensor may be a digital camera, and the sensor data includes digital image data.

In some embodiments, the computer-implemented method may further include utilizing machine learning techniques to analyze the sensor data to determine whether the item associated with the sensor data is plastic, aluminum, glass, or cardboard.

In some embodiments, the multi-compartment waste bin may be configured with at least one of a movable lid and a flap, the method further includes moving the at least one of the movable lid or flap to direct the waste item, once placed within the multi-compartment waste bin, to the waste compartment within the multi-compartment waste bin when the item is determined to be a waste item from processor analysis of the sensor data.

In some embodiments, the computer-implemented method may further include performing, via the at least one of the lid and the flap, at least one of opening one compartment and closing another compartment within the multi-compartment waste bin, and allowing gravity to move the waste item into the waste compartment within the multi-compartment waste bin once the waste item is placed or dropped into the multi-compartment waste bin.

In some embodiments, the multi-compartment waste bin may be configured with at least one of a movable lid and a flap, and the method further includes moving the at least one of the movable lid and the flap to direct the recyclable item, once placed within the multi-compartment waste bin, to the recyclable compartment within the multi-compartment waste bin when the item is determined to be a recyclable item from processor analysis of the sensor data.

In some embodiments, the computer-implemented method may further include receiving location data from the multi-compartment waste bin, and transmitting the location data to a client device associated with at least one user.

In some embodiments, the computer-implemented method may further include storing, in the at least one memory device, location data and user data received from one or more client devices of at least one user.

In some embodiments, the computer-implemented method may further include generating one or more notifications including at least one of recycling practices, bin locations, recycling days alerts, non-recycling days alerts, and bulletins addressing recycling, and transmitting the one or more notifications to at least one of client devices and electronic signs.

In some embodiments, the computer-implemented method may further include receiving, from the at least one sensor, a location of one or more multi-compartment waste bins, wherein the one or more multi-compartment waste bins include at least one internal recyclable bin and one internal waste bin, generating, using the received location, one or more maps including the one or more multi-compartment waste bins, and transmitting the one or more maps to one or more client devices for display on the one or more client devices.

In some embodiments, the computer-implemented method may further include generating a route map using the generated one or more maps, prioritizing the location of the one or more multi-compartment waste bins in the route map, wherein the prioritization is performed based upon ae level of waste of each multi-compartment waste bin, and transmitting the route map to one or more waste collection providers.

In yet another aspect, at least one non-transitory computer-readable media having computer-executable instructions thereon may be provided. The computer-executable instructions when executed by at least one processor (and/or associated transceiver) of a computing device for enhancing energy efficiency causes the at least one processor (and/or associated transceiver) to: (i) receive sensor data associated with an item from at least one sensor, wherein the sensor data is generated by the at least one sensor located proximate to a multi-compartment waste bin; (ii) utilize machine learning techniques to analyze the sensor data to determine whether the item is a waste item or a recyclable item; (iii) if the item is determined to be a waste item from analysis of the sensor data, automatically direct the waste item, once placed within the multi-compartment waste bin, to a waste compartment within the multi-compartment waste bin; and (iv) if the item is determined to be a recyclable item from analysis of the sensor data, automatically direct the recyclable item, once placed within the multi-compartment waste bin, to a recyclable compartment within the multi-compartment waste bin to facilitate separation of waste and recyclables into dedicated waste compartments and recyclable compartments, and the collection of recyclable items. The instructions may direct additional, less, or alternate functionality, including that discussed elsewhere herein.

In some embodiments, the computer-executable instructions may further cause the processor to determine, based upon a level of waste detected by a level sensor, whether collection of waste in the waste compartment within the multi-compartment waste bin is required, in response to determining that the collection of waste in the waste compartment within the multi-compartment waste bin is required, generate an alert including information corresponding to the multi-compartment waste bin for waste collection, and transmit the alert, via wireless communication, to one or more client devices associated with at least one user to notify the at least one user that the collection of waste in the waste compartment within the multi-compartment waste bin is required.

In some embodiments, the computer-executable instructions may further cause the processor to determine, based upon a level of recyclables detected by a level sensor, whether collection of recyclables in the recyclable compartment within the multi-compartment waste bin is required, in response to determining that the collection of recyclables in the recyclables compartment within the multi-compartment waste bin is required, generate an alert including information corresponding to the multi-compartment waste bin for the collection of recyclables, and transmit the alert, via wireless communication, to one or more client devices associated with at least one user to notify the at least one user that the collection of recyclables in the recyclables compartment within the multi-compartment waste bin is required.

In some embodiments, the at least one sensor may be a digital camera, and the sensor data includes digital image data.

In some embodiments, the computer-executable instructions mey further cause the processor to utilize machine learning techniques to analyze the sensor data to determine whether the item associated with the sensor data is plastic, aluminum, glass, or cardboard.

In some embodiments, the multi-compartment waste bin may be configured with at least one of a movable lid and a flap, and the computer-executable instructions further cause the processor to move the at least one of the movable lid or flap to direct the waste item, once placed within the multi-compartment waste bin, to the waste compartment within the multi-compartment waste bin when the item is determined to be a waste item from processor analysis of the sensor data.

In some embodiments, the at least one of the movable lid and the flap may be configured to perform at least one of open one compartment and close another compartment within the multi-compartment waste bin, and allow gravity to move the waste item into the waste compartment within the multi-compartment waste bin once the waste item is placed or dropped into the multi-compartment waste bin.

In some embodiments, the multi-compartment waste bin may be configured with at least one of a movable lid and a flap, and the computer-executable instructions further cause the processor to move the at least one of the movable lid and the flap to direct the recyclable item, once placed within the multi-compartment waste bin, to the recyclable compartment within the multi-compartment waste bin when the item is determined to be a recyclable item from processor analysis of the sensor data.

In some embodiments, the at least one movable lid and flap may be configured to perform at least one of open one compartment and close another within the multi-compartment waste bin, and allow gravity to move the recyclable item into the recyclable compartment within the multi-compartment waste bin once the recyclable item is placed or dropped into the multi-compartment waste bin.

In some embodiments, the computer-executable instructions may further cause the processor to receive location data from the multi-compartment waste bin, and transmit the location data to a client device associated with at least one user.

In some embodiments, the computer-executable instructions may further cause the processor to store, in the at least one memory device, location data and user data received from one or more client devices of at least one user.

In some embodiments, the computer-executable instructions may further cause the processor to generate one or more notifications including at least one of recycling practices, bin locations, recycling days alerts, non-recycling days alerts, and bulletins addressing recycling, and transmit the one or more notifications to at least one of client devices and electronic signs.

In some embodiments, the computer-executable instructions may further cause the processor to receive, from the at least one sensor, a location of one or more multi-compartment waste bins, wherein the one or more multi-compartment waste bins include at least one internal recyclable bin and one internal waste bin, generate, using the received location, one or more maps including the one or more multi-compartment waste bins, and transmit the one or more maps to one or more client devices for display on the one or more client devices.

In some embodiments, the computer-executable instructions may further cause the processor to generate a route map using the generated one or more maps, prioritize the location of the one or more multi-compartment waste bins in the route map, wherein the prioritization is performed based upon ae level of waste of each multi-compartment waste bin, and transmit the route map to one or more waste collection providers.

Additional Considerations

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, e.g., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium, such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In an exemplary embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality.

In some embodiments, the system includes multiple components distributed among a plurality of computer devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes. The present embodiments may enhance the functionality and functioning of computers and/or computer systems.

As used herein, an element or step recited in the singular and preceded by the word "a" or "an" should be understood as not excluding plural elements or steps, unless such exclusion is explicitly recited. Furthermore, references to "exemplary embodiment," "exemplary embodiment," or "one embodiment" of the present disclosure are not intended to be interpreted as excluding the existence of additional embodiments that also incorporate the recited features.

Furthermore, as used herein, the term "real-time" refers to at least one of the time of occurrence of the associated events, the time of measurement and collection of predetermined data, the time for a computing device (e.g., a processor) to process the data, and the time of a system response to the events and the environment. In the embodiments described herein, these activities and events occur substantially instantaneously.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A computer system for enhancing waste disposal, and alerting users in real-time of waste levels and contamination in waste bins, the computer system including at least one processor in communication with at least one memory device and at least one sensor, the at least one processor programmed to:
receive waste data and recycling data from a waste bin including at least one sensor integrated therein, the waste data corresponding to a fill level of waste in the waste bin, the recycling data including types of materials detected in the waste bin, wherein the waste data and the recycling data are gathered by the at least one sensor;
determine a level of waste in the waste bin based upon the received waste data;
compute a level of contamination of the waste bin based upon the received recycling data, the level of contamination corresponding to an amount of certain types of materials detected in the waste bin;
determine, based upon the level of waste, whether collection of waste in the waste bin is required;
determine, based upon the computed level of contamination satisfying a predefined threshold, whether decontamination of the waste bin is required;
in response to determining that one of collection of waste in the waste bin is required and decontamination of the waste bin is required, generate an alert including information corresponding to the waste bin;
transmit the alert, via wireless communication or data transmission, to one or more client devices associated with at least one user to notify the at least one user that the collection of waste in the waste bin is required or the decontamination of the waste bin is required;
and in response to determining that one of collection of waste in the waste bin is required and decontamination of the waste bin is required, cause an instruction to be sent to the waste bin placing the waste bin into a closed position, wherein the instruction to place the waste bin into a closed position causes the at least one sensor to move a lid of the waste bin to the closed position.

2. The computer system of claim 1, wherein the at least one processor is further programmed to:
receive user data from a client device associated with the at least one user; and
identify, using the user data, the at least one user as a user of the waste bin.

3. The computer system of claim 1, wherein the at least one processor is further programmed to:
receive location data from a client device associated with the at least one user; and
infer, using the location data, the location of the waste bin, wherein the waste bin is located proximate to the client device.

4. The computer system of claim 1, wherein the at least one processor is further programmed to store, in the at least one memory device, location data and user data received from the one or more client devices of the at least one user.

5. The computer system of claim 1, wherein the at least one processor is further programmed to:
generate a waste tutorial (WT) computer application, wherein the WT computer application provides instructions to the at least one user on how to recycle waste; and
transmit the WT computer application to the one or more client devices for use on the one or more client devices.

6. The computer system of claim 5, wherein the at least one processor is further programmed to:
receive, via the WT computer application, input from the at least one user, wherein the input includes at least one of a picture of an item to be disposed on the waste bin and a description of the item;
analyze the input to determine a type of waste of the item, wherein the type of waste includes one of a recyclable item and a non-recyclable item;
in response to determining the type of waste of the item, transmit, in real-time via the WT computer application to the one or more client devices, waste disposal instructions for the item, wherein the waste disposal instructions include one of disposing of the item in a recycle bin and disposing of the item in a non-recycle bin; and
cause the WT computer application to display the waste disposal instructions on the one or more client devices.

7. The computer system of claim 1, wherein the at least one processor is further programmed to:
generate one or more notifications including at least one of recycling practices, bin locations, recycling days alerts, non-recycling days alerts, and bulletins addressing recycling; and
transmit the one or more notifications to at least one of the one or more client devices and one or more electronic signs.

8. The computer system of claim 1, wherein the at least one processor is further programmed to:
receive, from the at least one sensor, a location of one or more waste bins, where the one or more waste bins include at least one a recyclable bin and a non-recyclable bin;
generate, using the received location, one or more maps including the one or more waste bins; and
transmit the one or more maps to the one or more client devices for display on the one or more client devices.

9. The computer system of claim 8, wherein the at least one processor is further programmed to:
generate a route map using the generated one or more maps;
prioritize the location of the one or more waste bins in the route map, wherein the prioritization is performed based upon the level of waste of each waste bin of the one or more waste bins and the level of contamination of each waste bin of the one or more waste bins; and
transmit the route map to one or more waste collection providers.

10. The computer system of claim 1, wherein the at least one processor is further programmed to:
identify, using the received waste data and the received recycling data, patterns of the at least one user;

build waste disposal models based upon the identified patterns of the at least one user;

generate one or more notifications including at least one indications of items that have been incorrectly recycled, ways to correctly recycle the items, and a link to a reward/point program that encourages the at least one user to correctly recycle the item; and transmit the one or more notifications to the one or more client devices.

11. A computer-implemented method for enhancing waste disposal, and alerting users in real-time of waste levels and contamination in waste bins, the method being implemented via a computer system including at least one processor and/or associated transceiver in communication with at least one memory device and at least one sensor, the method comprising:

receiving waste data and recycling data from a waste bin including at least one sensor integrated therein, the waste data corresponding to a fill level of waste in the waste bin, the recycling data including types of materials detected in the waste bin, wherein the waste data and the recycling data are gathered by the at least one sensor;

determining a level of waste in the waste bin based upon the received waste data;

computing a level of contamination of the waste bin based upon the received recycling data, the level of contamination corresponding to an amount certain types of materials detected in the waste bin;

determining, based upon the level of waste, whether collection of waste in the waste bin is required;

determining, based upon the computed level of contamination satisfying a predefined threshold, whether decontamination of the waste bin is required;

in response to determining that one of collection of waste in the waste bin is required and decontamination of the waste bin is required, generating an alert including information corresponding to the waste bin;

transmitting the alert, via wireless communication or data transmission, to one or more client devices associated with at least one user to notify the at least one user that the collection of waste in the waste bin is required or the decontamination of the waste bin is required;

and in response to determining that one of collection of waste in the waste bin is required and decontamination of the waste bin is required, causing an instruction to be sent to the waste bin placing the waste bin into a closed position, wherein the instruction to place the waste bin into a closed position causes the at least one sensor to move a lid of the waste bin to the closed position.

12. The computer-implemented method of claim 11, the method further comprising:

receiving user data from a client device associated with the at least one user; and identifying, using the user data, the at least one user as a user of the waste bin.

13. The computer-implemented method of claim 11, the method further comprising:

receiving location data from a client device associated with the at least one user; and inferring, using the location data, the location of the waste bin, wherein the waste bin is located proximate to the client device.

14. The computer-implemented method of claim 11, the method further comprising storing, in the at least one memory device, location data and user data received from the one or more client devices of the at least one user.

15. The computer-implemented method of claim 11, the method further comprising:

generating a waste tutorial (WT) computer application, wherein the WT computer application provides instructions to the at least one user on how to recycle waste; and transmitting the WT computer application to the one or more client devices for use on the one or more client devices.

16. The computer-implemented method of claim 15, the method further comprising:

receiving, via the WT computer application, input from the at least one user, wherein the input includes at least one of a picture of an item to be disposed on the waste bin and a description of the item;

analyzing the input to determine a type of waste of the item, wherein the type of waste includes one of a recyclable item and a non-recyclable item;

in response to determining the type of waste of the item, transmitting, in real-time via the WT computer application to the one or more client devices, waste disposal instructions for the item, wherein the waste disposal instructions include one of disposing of the item in a recycle bin and disposing of the item in a non-recycle bin; and causing the WT computer application to display the waste disposal instructions on the one or more client devices.

17. The computer-implemented method of claim 11, the method further comprising:

generating one or more notifications including at least one of recycling practices, bin locations, recycling days alerts, non-recycling days alerts, and bulletins addressing recycling; and transmitting the one or more notifications to at least one of the one or more client devices and one or more electronic signs.

18. The computer system of claim 1, wherein the level of contamination further includes an indication of whether recyclable materials contained within the waste bin have been miscategorized within the waste bin.

19. The computer system of claim 1, wherein the certain types of materials include liquid and/or food residue.

* * * * *